United States Patent
Fu et al.

(10) Patent No.: US 11,621,843 B2
(45) Date of Patent: *Apr. 4, 2023

(54) TRUSTED REMOTE PROVING METHOD, APPARATUS AND SYSTEM

(71) Applicant: Alibaba Group Holding Limited, Grand Cayman (KY)

(72) Inventors: Yingfang Fu, Yu Hang District (CN); Peng Xiao, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 77 days.

This patent is subject to a terminal disclaimer.

(21) Appl. No.: 17/220,498

(22) Filed: Apr. 1, 2021

(65) Prior Publication Data
US 2021/0226792 A1    Jul. 22, 2021

Related U.S. Application Data

(63) Continuation of application No. 16/207,011, filed on Nov. 30, 2018, now Pat. No. 10,999,072.

(51) Int. Cl.
*H04L 29/06* (2006.01)
*H04L 9/32* (2006.01)
(Continued)

(52) U.S. Cl.
CPC .............. *H04L 9/321* (2013.01); *H04L 9/30* (2013.01); *H04L 9/3268* (2013.01);
(Continued)

(58) Field of Classification Search
CPC ......... H04L 9/321; H04L 9/30; H04L 9/3268; H04L 9/3271; H04L 63/0442;
(Continued)

(56) References Cited

U.S. PATENT DOCUMENTS

| 7,418,401 B2 | 8/2008 | Bogasky et al. |
| 8,181,227 B2 | 5/2012 | Lau |

(Continued)

FOREIGN PATENT DOCUMENTS

| CN | 101043338 A | 9/2007 |
| CN | 101951388 A | 1/2011 |

(Continued)

OTHER PUBLICATIONS

Machine Translation Chinese Office Action dated Dec. 3, 2021 for Chinese patent application No. 201711015965.8, a counterpart foreign application of U.S. Appl. No. 16/207,011, 23 pages.
(Continued)

*Primary Examiner* — Harunur Rashid
(74) *Attorney, Agent, or Firm* — Lee & Hayes, P.C.

(57) ABSTRACT

The method includes receiving a challenge request sent by a first service trusted server and obtaining to-be-verified information of the first service trusted server in the challenge request; sending a verification request to a trusted remote proving server, wherein the verification request includes the to-be-verified information of the first service trusted server; and obtaining a verification response returned by the trusted remote proving server.

20 Claims, 32 Drawing Sheets

(51) Int. Cl.
*H04L 9/30* (2006.01)
*H04L 9/40* (2022.01)
*H04W 12/069* (2021.01)

(52) U.S. Cl.
CPC ........ *H04L 9/3271* (2013.01); *H04L 63/0442* (2013.01); *H04W 12/069* (2021.01)

(58) Field of Classification Search
CPC .......... H04L 63/0823; H04L 63/0876; H04W 12/069; G06F 21/44; G06F 21/57
See application file for complete search history.

(56) References Cited

U.S. PATENT DOCUMENTS

| | | | |
|---|---|---|---|
| 8,271,780 | B2 | 9/2012 | Xiao et al. |
| 9,208,350 | B2 | 12/2015 | Sabin et al. |
| 9,225,728 | B2 | 12/2015 | Du et al. |
| 9,363,259 | B2 | 6/2016 | Chenna |
| 9,391,980 | B1 | 7/2016 | Krahn et al. |
| 9,634,841 | B2 | 4/2017 | De Los Santos et al. |
| 9,832,026 | B2 | 11/2017 | Kravitz et al. |
| 2006/0155855 | A1 | 7/2006 | Hamai |
| 2008/0086634 | A1 | 4/2008 | Salowey et al. |
| 2008/0256595 | A1 | 10/2008 | Schunter et al. |
| 2009/0064292 | A1 | 3/2009 | Carter et al. |
| 2010/0115625 | A1* | 5/2010 | Proudler ................. G06F 21/57 726/27 |
| 2010/0306107 | A1 | 12/2010 | Nahari |
| 2011/0067095 | A1 | 3/2011 | Leicher et al. |
| 2014/0351589 | A1* | 11/2014 | Ch ..................... H04W 12/068 713/168 |
| 2015/0067813 | A1* | 3/2015 | Cha .................... H04L 63/0807 726/10 |
| 2015/0106898 | A1 | 4/2015 | Du et al. |
| 2016/0072626 | A1* | 3/2016 | Kouladjie ............... G06F 21/44 713/189 |
| 2017/0054707 | A1 | 2/2017 | Leicher et al. |
| 2019/0123903 | A1 | 4/2019 | Fu et al. |

FOREIGN PATENT DOCUMENTS

| | | |
|---|---|---|
| CN | 102594558 A | 7/2012 |
| CN | 103179129 A | 6/2013 |
| CN | 103560887 A | 2/2014 |
| CN | 105072088 A | 11/2015 |
| CN | 105227319 A | 1/2016 |
| WO | WO2011126357 | 10/2011 |

OTHER PUBLICATIONS

Machine Translation Chinese Supplementary Search Repod dated Nov. 25, 2021 for Chinese patent application No. 201711015965.8, a counterpart foreign application of U.S. Appl. No. 16/207,011, 2 pages.

Machine Translation Chinese Office Action dated May 7, 2021 for Chinese patent application No. 201711015965.8, a counterpart foreign application of U.S. Appl. No. 16/207,011, 10 pages.

The Chinese Search Report dated Apr. 26, 22021 for CN Application No. 201711015965.8, 2 pages.

Final Office Action dated Dec. 10, 2020 for U.S. Appl. No. 16/207,011, "Trusted Remote Proving Method, Apparatus and System," Fu, 10 pages.

Non Final Office Action dated Jun. 12, 2020 for U.S. Appl. No. 16/207,011 "Trusted Remote Proving Method, Apparatus and System," Fu, 10 pages.

The PCT Search Report and Written Opinion dated Apr. 1, 2019 for PCT Application No. PCT/US18/63488, 9 pages.

* cited by examiner

200

THE SERVICE TRUSTED SERVER A GENERATES A RANDOM NUMBER N
202

THE SERVICE TRUSTED SERVER A PROCESSES THE SERIAL NUMBER $A_{SN}$ AND THE RANDOM NUMBER N OF THE SERVICE TRUSTED SERVER USING THE PUBLIC KEY $AIK_{PK\_B}$ OF THE SERVICE TRUSTED SERVER B, AND ENCRYPT RESPECTIVE COMPONENT AND THE METRIC POLICY IDENTIFIER CORRESPONDING TO RESPECTIVE COMPONENT BY THE PLATFORM IDENTITY PUBLIC KEY $AIK_{PK\_V}$ OF THE TRUSTED REMOTE PROVING SERVER V
204

THE SERVICE TRUSTED SERVER A GENERATES THE CHALLENGE REQUEST USING THE CERTIFICATE OF THE SERVICE TRUSTED SERVER A, THE RANDOM NUMBER N, THE SERIAL NUMBER $A_{SN}$ OF THE SERVICE TRUSTED SERVER AND THE RANDOM NUMBER N THAT ARE ENCRYPTED THROUGH THE PUBLIC KEY $AIK_{PK\_B}$ OF THE SERVICE TRUSTED SERVER B, AND RESPECTIVE COMPONENT AND THE METRIC POLICY IDENTIFIER CORRESPONDING TO RESPECTIVE COMPONENT THAT ARE ENCRYPTED THROUGH THE PLATFORM IDENTITY PUBLIC KEY $AIK_{PK\_V}$ OF THE TRUSTED REMOTE PROVING SERVER V
206

THE SERVICE TRUSTED SERVER A SENDS THE CHALLENGE REQUEST TO THE SERVICE TRUSTED SERVER B
208 → To 210

```
┌─────────────────────────────────────────────────┐
│  RECEIVE THE CHALLENGE REQUEST SENT BY THE FIRST │
│  SERVICE TRUSTED SERVER, AND OBTAIN THE TO-BE-VERIFIED │
│  INFORMATION OF THE FIRST SERVICE TRUSTED SERVER IN THE │
│              CHALLENGE REQUEST                   │
│                     702                          │
└─────────────────────────────────────────────────┘
                        │
                        ▼
┌─────────────────────────────────────────────────┐
│  SEND THE VERIFICATION REQUEST TO THE TRUSTED REMOTE │
│   PROVING SERVER, WHERE THE VERIFICATION REQUEST │
│  INCLUDES THE TO-BE-VERIFIED INFORMATION OF THE FIRST │
│                 SERVICE SERVER.                  │
│                     704                          │
└─────────────────────────────────────────────────┘
                        │
                        ▼
┌─────────────────────────────────────────────────┐
│   OBTAIN THE VERIFICATION RESPONSE RETURNED BY THE │
│         TRUSTED REMOTE PROVING SERVER            │
│                     706                          │
└─────────────────────────────────────────────────┘
```

IN THE CASE WHERE TO-BE-VERIFIED INFORMATION FURTHER INCLUDES RESPECTIVE COMPONENT OF THE FIRST SERVICE TRUSTED SERVER AND CORRESPONDING METRIC POLICY IDENTIFIER ENCRYPTED THROUGH THE PUBLIC KEY OF THE TRUSTED REMOTE PROVING SERVER, GENERATE THE VERIFICATION REQUEST ACCORDING TO THE CERTIFICATE OF THE SECOND SERVICE TRUSTED SERVER, THE SERIAL NUMBER OF THE SECOND SERVICE TRUSTED SERVER, THE SECOND RANDOM NUMBER, THE SERIAL NUMBER OF THE FIRST SERVICE TRUSTED SERVER, AND RESPECTIVE COMPONENT OF THE FIRST SERVICE TRUSTED SERVER AND CORRESPONDING METRIC POLICY IDENTIFIER ENCRYPTED THROUGH THE PUBLIC KEY OF THE TRUSTED REMOTE PROVING SERVER
726

SEND THE VERIFICATION REQUEST TO THE TRUSTED REMOTE PROVING SERVER
728

IN THE CASE WHERE THE TO-BE-VERIFIED INFORMATION FURTHER INCLUDES RESPECTIVE COMPONENT OF THE SECOND SERVICE TRUSTED SERVER AND CORRESPONDING METRIC POLICY IDENTIFIER ENCRYPTED THROUGH THE PUBLIC KEY OF THE TRUSTED REMOTE PROVING SERVER, THE VERIFICATION REQUEST IS GENERATED ACCORDING TO THE CERTIFICATE OF THE SECOND SERVICE TRUSTED SERVER, THE SERIAL NUMBER OF THE SECOND SERVICE TRUSTED SERVER, THE SECOND RANDOM NUMBER, THE SERIAL NUMBER OF THE FIRST SERVICE TRUSTED SERVER, RESPECTIVE COMPONENT OF THE FIRST SERVICE TRUSTED SERVER AND CORRESPONDING METRIC POLICY IDENTIFIER ENCRYPTED THROUGH THE PUBLIC KEY OF THE TRUSTED REMOTE PROVING SERVER, AND RESPECTIVE COMPONENT OF THE SECOND SERVICE TRUSTED SERVER AND CORRESPONDING METRIC POLICY IDENTIFIER ENCRYPTED THROUGH THE PUBLIC KEY OF THE TRUSTED REMOTE PROVING SERVER
730

SEND THE VERIFICATION REQUEST TO THE TRUSTED REMOTE PROVING SERVER
732

```
SEND THE PLATFORM METRIC POLICY REQUEST TO THE
TRUSTED POLICY MANAGEMENT SERVER
748
```
↓
```
RECEIVE THE PLATFORM METRIC POLICY RESPONSE RETURNED
BY THE TRUSTED POLICY MANAGEMENT SERVER
750
```
↓
```
VERIFY WHETHER THE CERTIFICATE OF THE TRUSTED POLICY
MANAGEMENT SERVER IS LEGITIMATE
752
```
↓
```
IN THE CASE WHERE THE VERIFICATION RESULT IS YES, THE
CIPHERTEXT IS DECRYPTED
754
```
↓
```
DEPLOY THE METRIC POLICY IDENTIFIER AND THE COMPONENT
METRIC ALGORITHM IN RESPECTIVE COMPONENT
756
```
↓
To _702_

THE SECOND SERVICE TRUSTED SERVER SENDS THE PLATFORM METRIC POLICY REQUEST TO THE TRUSTED POLICY MANAGEMENT SERVER
758

↓

THE SECOND SERVICE TRUSTED SERVER RECEIVES THE PLATFORM METRIC POLICY RESPONSE SENT BY THE TRUSTED POLICY MANAGEMENT SERVER
760

↓

THE SECOND SERVICE TRUSTED SERVER VERIFIES WHETHER THE CERTIFICATE OF THE TRUSTED POLICY MANAGEMENT SERVER $Cert\_AIK_S$ IS LEGITIMATE
762

IF THE CERTIFICATE IS LEGITIMATE, THE SECOND SERVICE TRUSTED SERVER DECRYPTSRESPECTIVE COMPONENT AND THE METRIC POLICY IDENTIFIER CORRESPONDING TO RESPECTIVE COMPONENT AND THE CMA CORRESPONDING TO THE POLICY IDENTIFIER OF THE SECOND SERVICE TRUSTED SERVER ENCRYPTED THROUGH THE PUBLIC KEY OF THE SECOND SERVICE TRUSTED SERVER
764

IF THE CERTIFICATE IS NOT LEGITIMATE, THE PROCESS IS TERMINATED
766

↓

THE SECOND SERVICE TRUSTED SERVER WRITES THE CMA TO EACH GROUP CORRESPONDING TO THE POLICY PROFILE SO AS TO PROVE THAT THE REMOTE CERTIFICATE IS A COMPONENT THAT USES THE CMA RESPONSE
768

> RECEIVE THE VERIFICATION REQUEST SENT BY THE SECOND SERVICE TRUSTED SERVER, WHERE THE VERIFICATION REQUEST INCLUDES THE TO-BE-VERIFIED INFORMATION OF THE FIRST SERVICE SERVER. THE SECOND SERVICE TRUSTED SERVER INTERACTS WITH THE FIRST SERVICE TRUSTED SERVER
> 802

> RETURN THE CORRESPONDING VERIFICATION RESPONSE TO THE SECOND SERVICE TRUSTED SERVER ACCORDING TO THE VERIFICATION REQUEST
> 804

```
┌─────────────────────────────────────────────┐
│  THE TRUSTED REMOTE PROVING SERVER RECEIVES THE │
│            VERIFICATION REQUEST             │
│                    806                      │
└─────────────────────────────────────────────┘
                      │
                      ▼
┌─────────────────────────────────────────────┐
│ THE TRUSTED REMOTE PROVING SERVER VERIFIES WHETHER │
│ THE CERTIFICATE OF THE SECOND SERVICE TRUSTED SERVER │
│                 IS LEGITIMATE               │
│                     808                     │
└─────────────────────────────────────────────┘
```

IF THE CERTIFICATE IS LEGITIMATE, THE TRUSTED REMOTE PROVING SERVER DECRYPTS RESPECTIVE COMPONENT AND THE METRIC POLICY IDENTIFIER CORRESPONDING TO RESPECTIVE COMPONENT ENCRYPTED THROUGH THE PLATFORM IDENTITY PUBLIC KEY $AIK_{pk\_v}$ OF THE TRUSTED REMOTE PROVING SERVER
810

IF THE CERTIFICATE IS NOT LEGITIMATE, THE PROCESS IS TERMINATED
812

THE TRUSTED REMOTE PROVING SERVER QUERIES THE POLICY LIBRARY, AND DETERMINES WHETHER THE DECRYPTED CIPHERTEXT OF THE COMPONENT HASH VALUE AND THE HASH VALUE OF THE COMPONENT IN THE POLICY LIBRARY TABLE ARE EQUAL
814

IF THE DECRYPTED CIPHERTEXT OF THE COMPONENT HASH VALUE IS EQUAL TO THE COMPONENT HASH VALUE, THE TRUSTED REMOTE PROVING SERVER SENDS A VERIFICATION RESPONSE TO THE SECOND SERVICE TRUSTED SERVER
816

IF THE DECRYPTED CIPHERTEXT OF THE COMPONENT HASH VALUE IS NOT EQUAL TO THE COMPONENT HASH VALUE, THE PROCESS IS TERMINATED
818

```
┌─────────────────────────────────────────────────────────────────────────┐
│ RECEIVE THE PLATFORM METRIC POLICY RESPONSE, WHERE THE PLATFORM METRIC  │
│ POLICY REQUEST INCLUDES THE CERTIFICATE AND THE SERIAL NUMBER OF THE    │
│ SERVICE TRUSTED SERVER, AND RESPECTIVE COMPONENT OF THE SERVICE TRUSTED │
│ SERVER AND CORRESPONDING METRIC POLICY IDENTIFIER ENCRYPTED THROUGH THE │
│ PUBLIC KEY OF THE TRUSTED POLICY MANAGEMENT SERVER                      │
│ 902                                                                     │
└─────────────────────────────────────────────────────────────────────────┘
                                    ↓
┌─────────────────────────────────────────────────────────────────────────┐
│ VERIFY WHETHER THE CERTIFICATE OF THE SERVICE TRUSTED SERVER IS         │
│ LEGITIMATE                                                              │
│ 904                                                                     │
└─────────────────────────────────────────────────────────────────────────┘
                                    ↓
┌─────────────────────────────────────────────────────────────────────────┐
│ IN THE CASE WHERE THE VERIFICATION RESULT IS YES, DECRYPT THE RESPECTIVE│
│ COMPONENT OF THE SERVICE TRUSTED SERVER AND CORRESPONDING METRIC POLICY │
│ IDENTIFIER THROUGH THE PRIVATE KEY OF THE TRUSTED POLICY MANAGEMENT     │
│ SERVER, TO OBTAIN THE SERIAL NUMBER OF THE SERVICE TRUSTED SERVER,      │
│ RESPECTIVE COMPONENT AND THE METRIC POLICY IDENTIFIER CORRESPONDING TO  │
│ RESPECTIVE COMPONENT                                                    │
│ 906                                                                     │
└─────────────────────────────────────────────────────────────────────────┘
                                    ↓
┌─────────────────────────────────────────────────────────────────────────┐
│ ACCORDING TO THE CORRESPONDING COMPONENT AND THE METRIC POLICY          │
│ IDENTIFIER CORRESPONDING TO THE COMPONENT, OBTAIN THE COMPONENT METRIC  │
│ ALGORITHM CORRESPONDING TO THE METRIC POLICY IDENTIFIER AND THE         │
│ COMPONENT HASH VALUE THROUGH QUERYING THE POLICY LIBRARY                │
│ 908                                                                     │
└─────────────────────────────────────────────────────────────────────────┘
                                    ↓
┌─────────────────────────────────────────────────────────────────────────┐
│ ENCRYPT THE RESPECTIVE COMPONENT, THE METRIC POLICY IDENTIFIER          │
│ CORRESPONDING TO RESPECTIVE COMPONENT, THE COMPONENT METRIC ALGORITHM,  │
│ AND THE COMPONENT HASH VALUE THROUGH THE PUBLIC KEY OF THE SERVICE      │
│ TRUSTED SERVER, TO OBTAIN THE PLATFORM METRIC POLICY CIPHERTEXT         │
│ 910                                                                     │
└─────────────────────────────────────────────────────────────────────────┘
                                    ↓
┌─────────────────────────────────────────────────────────────────────────┐
│ OBTAIN THE PLATFORM METRIC POLICY RESPONSE ACCORDING TO THE CERTIFICATE │
│ OF THE TRUSTED POLICY MANAGEMENT SERVER, THE SERIAL NUMBER OF THE       │
│ SERVICE TRUSTED SERVER, AND THE PLATFORM METRIC POLICY CIPHERTEXT       │
│ 912                                                                     │
└─────────────────────────────────────────────────────────────────────────┘
                                    ↓
┌─────────────────────────────────────────────────────────────────────────┐
│ SEND THE PLATFORM METRIC POLICY RESPONSE TO THE SERVICE TRUSTED SERVER  │
│ 914                                                                     │
└─────────────────────────────────────────────────────────────────────────┘
```

FIG. 9A

TRUSTED REMOTE PROVING METHOD, APPARATUS AND SYSTEM

CROSS REFERENCE TO RELATED PATENT APPLICATIONS

This Application is a continuation of and claims priority to U.S. patent application Ser. No. 16/207,011, filed on Nov. 30, 2018, which claims priority to Chinese Patent Application No. 201711015965.8, filed on 25 Oct. 2017, entitled "Trusted Remote Proving Method, Device, and System" which are hereby incorporated by reference in their entirety.

TECHNICAL FIELD

The present application relates to the field of Internet technology applications, and in particular, to trusted remote proving methods, apparatuses, and systems.

BACKGROUND

In a cloud environment, in the scenario where the software and hardware configurations of the server platform system are dynamically changed, when the servers interact with each other, how to mutually authenticate the communication party is a legitimate user request from a legitimate and trusted platform.

In conventional techniques, TPM-Based Remote Proving (TRA) based on the Trusted Platform Module (TPM) is an activity that promises the integrity of a target. As an example, the challenger makes a decision on whether the target's status is integrated based on the integrity evidence provided by the target. This activity involves the following terms.

(1) Challenger is a participant who promises the integrity of the target.

(2) Target is a participant who provides the integrity evidence to prove the integrity of its status.

(3) TPM is a security chip that provides guarantee for the integrity and authenticity of the evidence, typically, this chip is physically bound to the computing platform.

(4) TPM-Based Remote Proving Protocol (TRAP) is an agreement involving three parties: challenger, target, and trusted platform module. The goal of the agreement is to provide the challenger with authoritative evidence to provide evidential guarantee for the correct decision of the challenger.

In conventional techniques, in the initialization phase, the TPM-based remote proving mechanism writes the platform configuration reference value into the PCR of the TPM when the deployment checking policy is initialized, and then takes effect after it is started. This is for the Basic Input Output System (BIOS), the Baseboard Management Controller (BMC) and other firmware, and the system OS kernel or the scenario where application software is continuously updated. The update of platform configuration and system software and hardware will cause the update of the checking policy and the restart of the device, resulting in difficulties in the management of the checking policy and the interruption of the business operation. Often, due to the update error of the checking policy, the checking fails, and the system fails to start.

Moreover, in the proving phase, the SML or PCR10 in the TPM-based remote proving mechanism is transmitted in plaintext during the transmission process. Thus, if the information is intercepted during the transmission process, the privacy will be revealed. Meanwhile, since it is completely open to the challenger, it is incapable of providing privacy protection for the challenger.

For the above, in the remote proving of conventional techniques, no effective solution has been proposed to solve the problem of the operation of the server terminal being affected during the policy deployment process and the information security caused by the plaintext transmission.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present application provide a trusted remote proving method, apparatus, and system to solve at least the technical problem of affecting the operation of the server terminal during the policy deployment and the information security issue caused by the plaintext transmission in the remote proving mechanism of the conventional techniques.

According to an aspect of an embodiment of the present application, a trusted remote proving method is provided. The method comprises: receiving a challenge request sent by a first service trusted server and obtaining to-be-verified information of the first service trusted server in the challenge request; sending a verification request to a trusted remote proving server, wherein the verification request includes the to-be-verified information of the first service trusted server; obtaining a verification response returned by the trusted remote proving server.

In an example embodiment, the challenge request comprises: a certificate of the first service trusted server, a serial number and a first random number of the first service trusted server encrypted through a public key of a second service trusted server, and respective component of the first service trusted server and corresponding metric policy identifier encrypted through a public key of the trusted remote proving server.

Furthermore, obtaining the to-be-verified information of the first service trusted server in the challenge request comprises: verifying that the certificate of the first service trusted server is legitimate; in the case where the result of the verification is legitimate, decrypting a ciphertext in the challenge request through a private key of the second service trusted server to obtain the to-be-verified information, wherein the to-be-verified information includes a serial number and a random number of the first service trusted server; in the case where the result of the verification is illegitimate, terminating operation.

In an example embodiment, sending the verification request to the trusted remote proving server comprises: in the case where the to-be-verified information further includes respective component of the first service trusted server and corresponding metric policy identifier encrypted through the public key of the trusted remote proving server, according to a certificate of the second service trusted server, a sequence number of the second service trusted server, a second random number, the sequence number of the first service trusted server, and respective component of the first service trusted server and corresponding metric policy identifier encrypted through the public key of the trusted remote proving server, generating the verification request; sending the verification request to the trusted remote proving server.

Furthermore, in an example embodiment, sending the verification request to the trusted remote proving server comprises: in the case where the to-be-verified information further includes respective component of the second service trusted server and corresponding metric policy identifier encrypted through the public key of the trusted remote proving server, according to a certificate of the second service trusted the server, the sequence number of the second service trusted server, the second random number, the sequence number of the first service trusted server, respective component of the first service trusted server and corresponding metric policy identifier encrypted through the public key of the trusted remote proving server, and respective component of the second service trusted server and the corresponding metric policy identifier encrypted through the public key of the trusted remote proving server, generating the verification request; sending the verification request to the trusted remote proving server.

In an example embodiment, obtaining the verification response returned by the trusted remote proving server comprises: in the case where a ciphertext in the verification response is a public key of a second service trusted server, verifying whether a certificate of the trusted remote proving server in the verification response is legitimate; in the case where the result of the verification is legitimate, decrypting the ciphertext through a private key of the second service trusted server to obtain an identity of the first service trusted server and legitimacy of a platform in which the first service trusted server is located; in the case where the result of the verification is illegitimate, terminating operation.

In an example embodiment, before receiving the challenge request sent by the first service trusted server, the method further comprises: sending a platform metric policy request to a trusted policy management server; wherein the platform metric policy request includes: a certificate and a serial number of a second service trusted server, and respective component of the second service trusted server and corresponding metric policy identifier encrypted through a public key of the trusted policy management server; receiving a platform metric policy response returned by the trusted policy management server, wherein the platform metric policy response includes: a sequence number of the second service trusted server, a certificate of the trusted policy management server, and a ciphertext encrypted through a public key of the second service trusted server; verifying whether the certificate of the trusted policy management server in the platform metric policy response is legitimate; in the case where the result of the verification is yes, decrypting the ciphertext through a private key of the second service trusted server to obtain the respective component of the second service trusted server, the metric policy identifier corresponding to the respective component, and a component metric algorithm; deploying the metric policy identifier and the component metric algorithm in the respective component.

According to another aspect of an embodiment of the present application, a trusted remote proving method is also provided. The method comprises: receiving a verification request sent by a second service trusted server, wherein the verification request includes: to-be-verified information of a first service trusted server, and the second service trusted server interacts with the first service trusted server; returning a corresponding verification response to the second service trusted server according to the verification request.

In an example embodiment, returning the corresponding verification response to the second service trusted server according to the verification request comprises: in the case where the verification request includes a certificate of the second service trusted server, and a serial number of the second service trusted server, a serial number of the first service trusted server, a random number, and a ciphertext encrypted through a public key of the trusted remote proving server, verifying whether the certificate of the second service trusted server is legitimate; in the case where the result of the verification is legitimate, decrypting by using a private key of the trusted remote proving server to obtain the serial number of the second service trusted server, the serial number of the first service trusted server, the random number, and the decrypted ciphertext, wherein the ciphertext includes: respective component of the first service trusted server and a corresponding metric policy identifier; determining legitimacy of the first service trusted server; returning the corresponding verification response to the second service trusted server.

Furthermore, in an example embodiment, determining the legitimacy of the first service trusted server comprises: decrypting the respective component of the first service trusted server and corresponding metric result ciphertext according to a public key of the first service trusted server, and obtaining a component metric algorithm according to the serial number of the first service trusted server; matching the component metric algorithm with a component value result in a preset policy library table to determine whether they are equal; in the case where the result of the determination is yes, determining that the first service trusted server and a platform in which the first service trusted server is located are legitimate; in the case where the result of the determination is negative, terminating operation.

In an example embodiment, returning the corresponding verification response to the second service trusted server comprises: generating the verification response according to the certificate of the trusted remote proving server, and a verification response ciphertext encrypted through a public key of the second service trusted server, wherein the verification response ciphertext includes: a random number and information of determining that the first service trusted server and a platform in which the first service trusted server is located are legitimate; returning the verification response to the second service trusted server.

In an example embodiment, returning the corresponding verification response to the second service trusted server comprises: in the case where the verification request further includes respective component of the second service trusted server and corresponding metric policy identifier encrypted through a public key of the trusted remote proving server, verifying the legitimacy of the second service trusted server; returning a corresponding verification response to the first service trusted server.

According to another aspect of the embodiment of the present application, a trusted remote proving method is further provided. The method comprises: receiving a platform metric policy request; wherein the platform metric policy request includes: a certificate and a serial number of a service trusted server, and respective component of the service trusted server and corresponding metric policy identifier encrypted through a public key of the trusted policy management server; verifying whether the certificate of the service trusted server is legitimate; in the case where the result of the verification is yes, decrypting the respective component of the service trusted server and the corresponding metric policy identifier through a private key of the trusted policy management server to obtain the serial number and the respective component of the service trusted server and the metric policy identifier corresponding to the respective component; according to the respective component and the metric policy identifier corresponding to the respective component, obtaining a component metric algorithm and a component metric hash value corresponding to the metric policy identifier by querying a policy library; encrypting the respective component, the metric policy identifier corresponding to the respective component, the component metric algorithm, and the component metric hash value by a public key of the service trusted server to obtain a platform metric policy ciphertext; obtaining a platform metric policy response according to a certificate of the trusted policy management server, the serial number of the service trusted server, and the platform metric policy ciphertext; sending the platform metric policy response to the service trusted server.

According to an aspect of another embodiment of the present application, a trusted remote proving apparatus is further provided. The apparatus comprises: a receiving module configured to receive a challenge request sent by a first service trusted server, and obtain to-be-verified information of the first service trusted server in the challenge request; a sending module configured to send a verification request to a trusted remote proving server, wherein the verification request includes the to-be-verified information of the first service trusted server; an obtaining module configured to obtain a verification response returned by the trusted remote proving server.

In an example embodiment, the challenge request comprises: a certificate of the first service trusted server, a serial number and a first random number of the first service trusted server encrypted through a public key of a second service trusted server, and respective component of the first service trusted server and corresponding metric policy identifier encrypted through a public key of the trusted remote proving server.

According to another aspect of another embodiment of the present application, a trusted remote proving apparatus is further provided. The apparatus comprises: an information receiving module configured to receive a verification request sent by a second service trusted server, wherein the verification request includes: to-be-verified information of a first service trusted server, and the second service trusted server interacts with the first service trusted server; a response feedback module configured to return a corresponding verification response to the second service trusted server according to the verification request.

In an example embodiment, the response feedback module comprises: a verification unit configured to verify whether a certificate of the second service trusted server is legitimate in the case where the verification request includes the certificate of the second service trusted server, and a serial number of the second service trusted server, a serial number of the first service trusted server, a random number, and a ciphertext encrypted through a public key of the trusted remote proving server; a decryption unit configured to decrypt by using a private key of the trusted remote proving server in the case where the result of the verification is legitimate, to obtain the serial number of the second service trusted server, the serial number of the first service trusted server, the random number, and the decrypted ciphertext, wherein the ciphertext includes: respective component of the first service trusted server and a corresponding metric policy identifier; a determining unit configured to determine legitimacy of the first service trusted server; a response feedback unit configured to return a corresponding verification response to the second service trusted server.

According to still another aspect of another embodiment of the present application, a trusted remote proving apparatus is further provided. The apparatus comprises: a receiving module configured to receive a platform metric policy request; wherein the platform metric policy request includes: a certificate and a serial number of a service trusted server, and respective component of the service trusted server and corresponding metric policy identifier encrypted through a public key of the trusted policy management server; a verification module configured to verify whether the certificate of the service trusted server is legitimate; a decryption module configured to decrypt the respective component of the service trusted server and the corresponding metric policy identifier through a private key of the trusted policy management server in the case where the result of the verification is yes, to obtain the serial number and the respective component of the service trusted server and the metric policy identifier corresponding to the respective component; a query module configured to obtain a component metric algorithm and a component metric hash value corresponding to the metric policy identifier by querying a policy library according to the respective component and the metric policy identifier corresponding to the respective component; an encryption module configured to encrypt the respective component, the metric policy identifier corresponding to the respective component, the component metric algorithm, and the component metric hash value by a public key of the service trusted server to obtain a platform metric policy ciphertext; a message generating module configured to obtain a platform metric policy response according to a certificate of the trusted policy management server, the serial number of the service trusted server, and the platform metric policy ciphertext; a sending module configured to send the platform metric policy response to the service trusted server.

According to still another aspect of another embodiment of the present application, a trusted remote proving system is further provided. The system comprises: a first service trusted server, a second service trusted server, and a trusted remote proving server, wherein the second service trusted server is configured to receive a challenge request sent by a first service trusted server, and obtain to-be-verified information of the first service trusted server in the challenge request, and send a verification request to a trusted remote proving server, wherein the verification request includes the to-be-verified information of the first service trusted server, and obtain a verification response returned by the trusted remote proving server; the trusted remote proving server is configured to receive a verification request sent by a second service trusted server and return a corresponding verification response to the second service trusted server according to the verification request, wherein the verification request includes: to-be-verified information of a first service trusted server, and the second service trusted server interacts with the first service trusted server.

In an example embodiment, the trusted remote proving system further comprises: a trusted policy management server, wherein before the second service trusted server receives the challenge request sent by the first service trusted server, the trusted policy management server receives a platform metric policy request sent by each of the first service trusted server and the second service trusted server, and return a corresponding platform metric policy response according to the platform metric policy request, so that the first service trusted server and the second service trusted server perform policy configuration according to the platform metric policy response.

According to an aspect of still another embodiment of the present application, a trusted remote proving method is further provided. The method comprises: encrypting to-be-verified information by a public key of a trusted remote proving server, to obtain the encrypted to-be-verified information; forwarding the encrypted to-be-verified information to the trusted remote proving server by a second service trusted server.

According to an aspect of another embodiment of the present application, a trusted remote proving method is further provided. The method comprises: receiving a platform metric policy request sent by a service trusted server; wherein the platform metric policy request includes: respective component of the service trusted server and corresponding metric policy identifier encrypted through a public key of a trusted policy management server; generating a platform metric policy response according to the respective component of the service trusted server and the corresponding metric policy identifier; sending the platform metric policy response to the service trusted server.

According to an aspect of another embodiment of the present application, a trusted remote proving method is further provided. The method comprises: receiving a platform metric policy response sent by a trusted policy management server; configuring a metric algorithm in the platform metric policy response and a metric policy corresponding to each component in a policy configuration file.

In the embodiments of the present application, by receiving a challenge request sent by a first service trusted server and obtaining to-be-verified information of the first service trusted server in the challenge request; sending a verification request to a trusted remote proving server, wherein the verification request includes the to-be-verified information of the first service trusted server; obtaining a verification response returned by the trusted remote proving server, the purpose of securing the privacy information of the service trusted server platform is achieved, thereby realizing the technical effect of improving the security of information transmission and in turn solving the technical problem of affecting the operation of the server terminal during the policy deployment and the information security issue caused by the plaintext transmission in the remote proving mechanism of the conventional techniques.

BRIEF DESCRIPTION OF THE DRAWINGS

In order to illustrate the example embodiments of the present disclosure more clearly, the drawings used in the description of the example will be briefly introduced below. Apparently, the drawings in the following description represent some of the example embodiments of the present disclosure, and other drawings may be obtained from these drawings by those skilled in the art without any creative work.

The drawings described herein are intended to provide a further understanding of the present application and are intended to be a part of the present application. The illustrative embodiments of the present application and the description thereof are for explaining the present application and do not constitute an undue limitation to the present application.

FIGS. 2A, 2B, 2C, and 2D are schematic diagrams of a verification process in a trusted remote proving system according to Embodiment 1 of the present application.

FIGS. 7A, 7B, 7C, 7D, 7E, 7F, 7G, 7H, and 7I are flowcharts of a trusted remote proving method according to Embodiment 2 of the present application.

FIGS. 8A, 8B, 8C, 8D, 8E, and 8F are flowcharts of a trusted remote proving method according to Embodiment 3 of the present application.

FIGS. 9A and 9B are flowcharts of a trusted remote proving method according to Embodiment 4 of the present application.

DETAILED DESCRIPTION

In order to enable a person of ordinary skill in the art understand the present application better, hereinafter, technical solutions in embodiments of the present application will be clearly and completely described with reference to the accompanying drawings in the embodiments of the present application. The embodiments described herein represent some of the embodiments of the present application. Based on the embodiments in the present application, all other embodiments obtained by a person of ordinary skill in the art without creative efforts shall fall within the protection scope of the present application.

It should be noted that the terms "first", "second" and the like in the specification, claims, and the above drawings of the present application are used to distinguish similar objects, but are not limited to a specific order or sequence. It is to be understood that the numbers so used are interchangeable, as appropriate, so that the embodiments of the present application described herein may be implemented in a sequence other than that illustrated or described herein. Moreover, terms "comprise", "have", and any variants thereof are intended to cover a non-exclusive inclusion. For example, a process, a method, a system, a product, or a device that comprises a series of steps or units is not necessarily limited to those steps or units that are listed, but may include other steps or units inherent to these processes, methods, products, or devices that are not listed.

Technical terms related to the present application are as follows:

Trusted Computing: Trusted computing is a trusted computing platform supported by hardware-based security modules in computing and communication systems to improve overall system security.

Trusted Platform Module (TPM): A security chip that provides integrity and authenticity for evidence, typically physically bound to the computing platform.

Remote Proof: An activity in a computer network that a computer commits to the integrity of its platform based on evidence provided by another computer.

Embodiment 1

Figure 1:
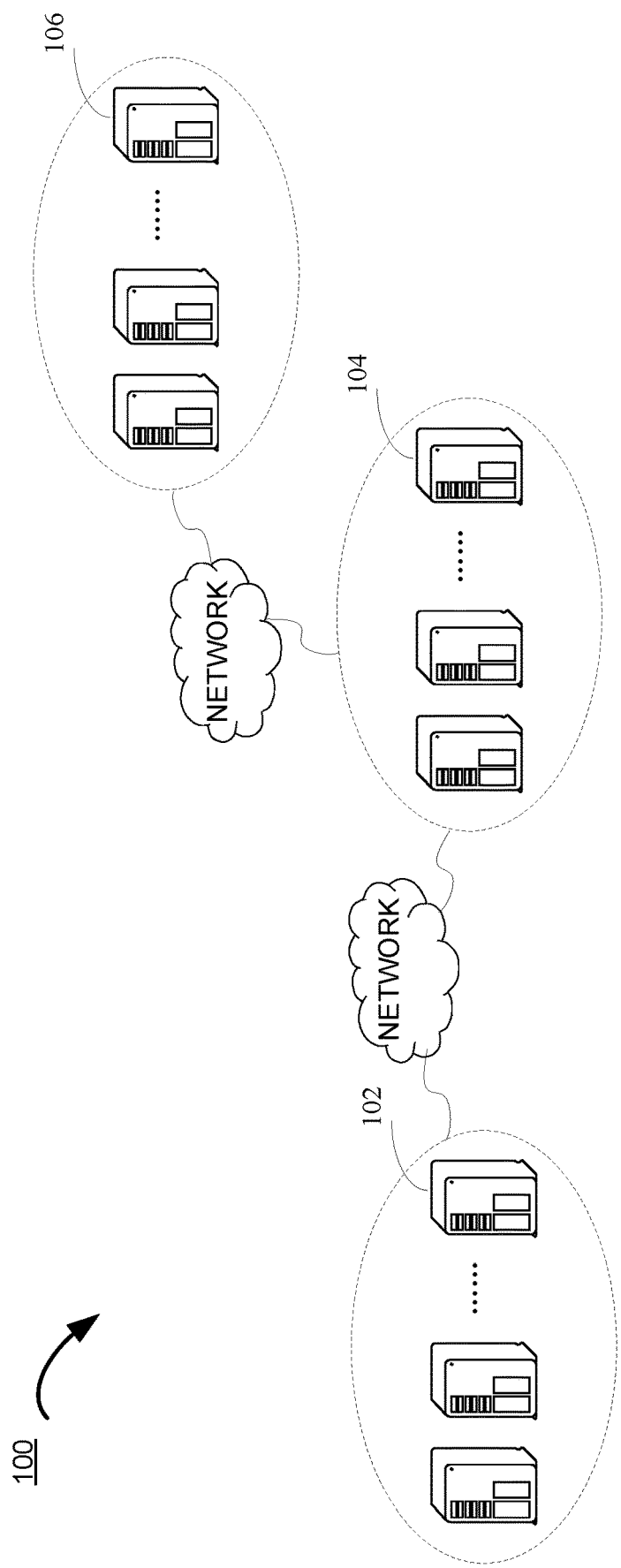
FIG. 1 is a schematic structural diagram of a trusted remote proving system according to Embodiment 1 of the present application.

The present application provides a trusted remote proving system 100 as shown in FIG. 1. FIG. 1 is a schematic structural diagram of a trusted remote proving system 100 according to Embodiment 1 of the present application. The trusted remote proving system 100 provided by this application includes the following: the first service trusted server 102, the second service trusted server 104, and the trusted remote proving server 106.

The second service trusted server 104 is configured to receive a challenge request sent by the first service trusted server 102 and obtain the to-be-verified information of the first service trusted server 102 in the challenge request.

The second service trusted server 104 is further configured to send the verification request to the trusted remote proving server 106, where the verification request includes the to-be-verified information of the first service trusted server 102. The second service trusted server 104 is further configured to obtain the verification response returned by the trusted remote proving server 106.

The trusted remote proving server 106 is configured to receive the verification request sent by the second service trusted server 104, where the verification request includes the to-be-verified information of the first service trusted server 102. The trusted remote proving server 106 is further configured to return the corresponding verification response to the second service trusted server 104 according to the verification request.

In an example embodiment, the trusted remote proving system 100 provided by the present application uses two the service trusted servers to bidirectionally verify the identity with each other and the legitimacy of the platform in an interaction process. The two the service trusted servers are respectively described by taking the service trusted server A (i.e., the first service trusted server 102 provided by the embodiment of the present application) and the service trusted server B (i.e., the second service trusted server 104 provided by the embodiment of the present application) as examples. The trusted remote proving server 106 is represented as a remote proving server V.

Figure 2B:
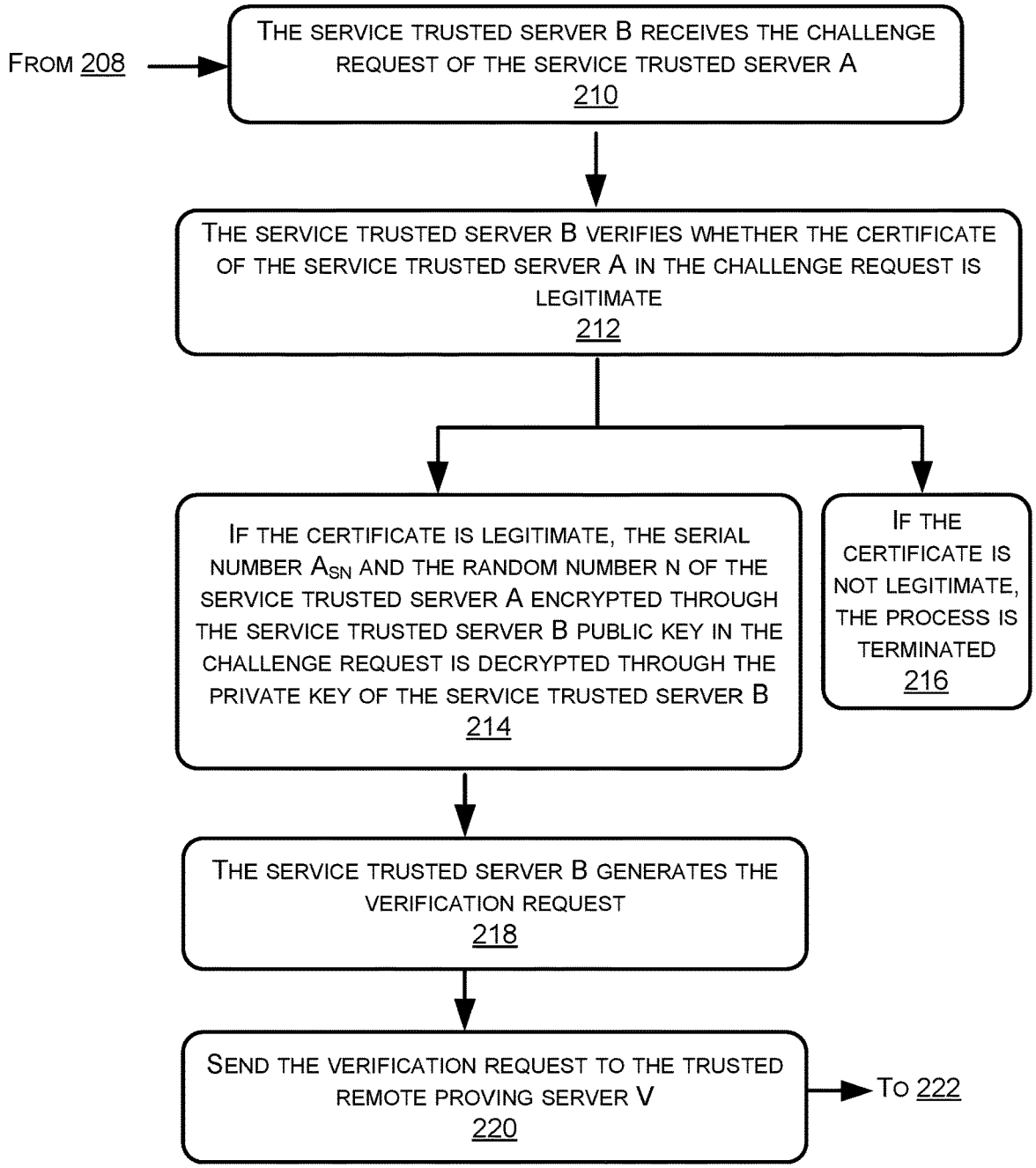
Figure 2C:
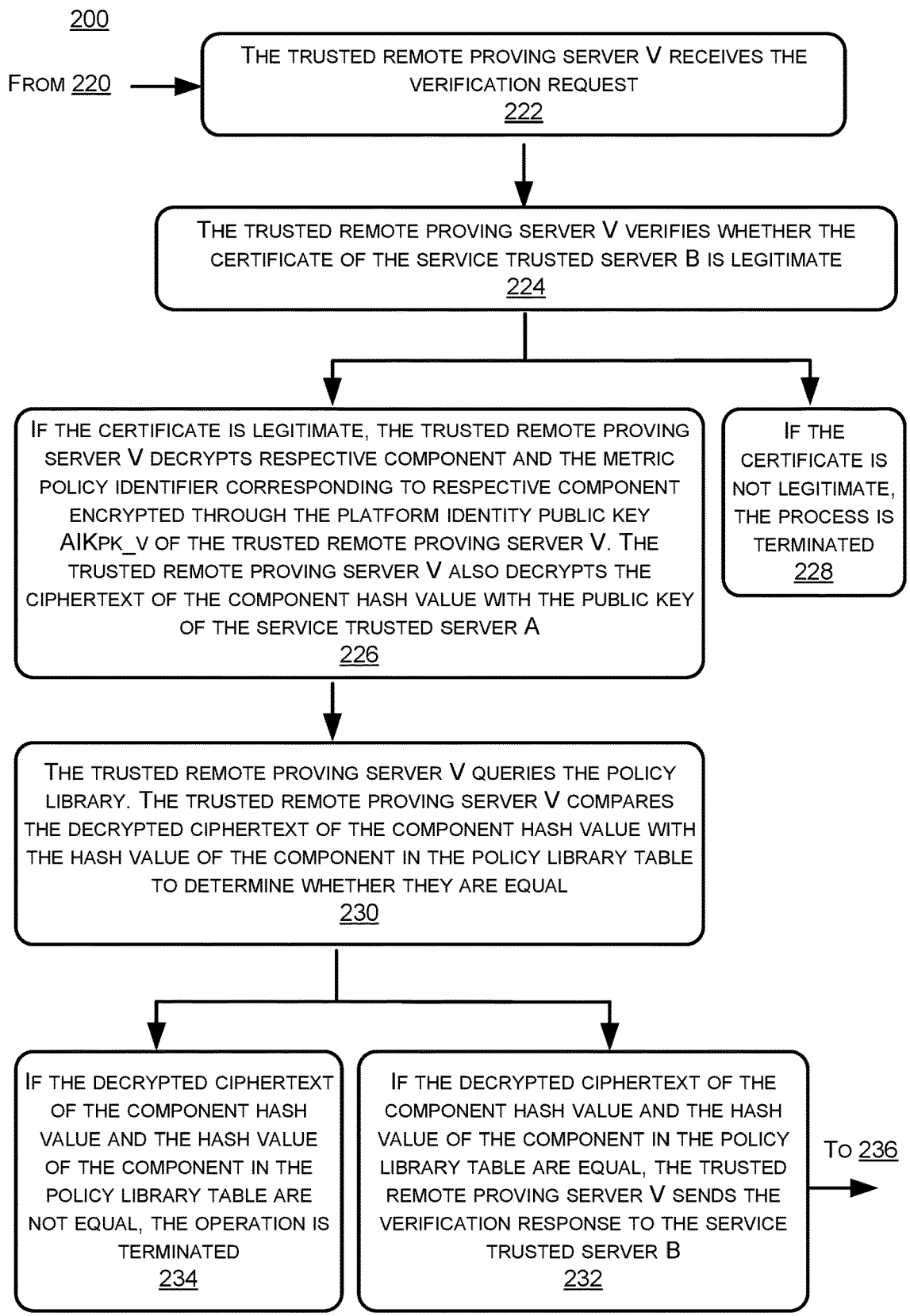
Figure 2D:
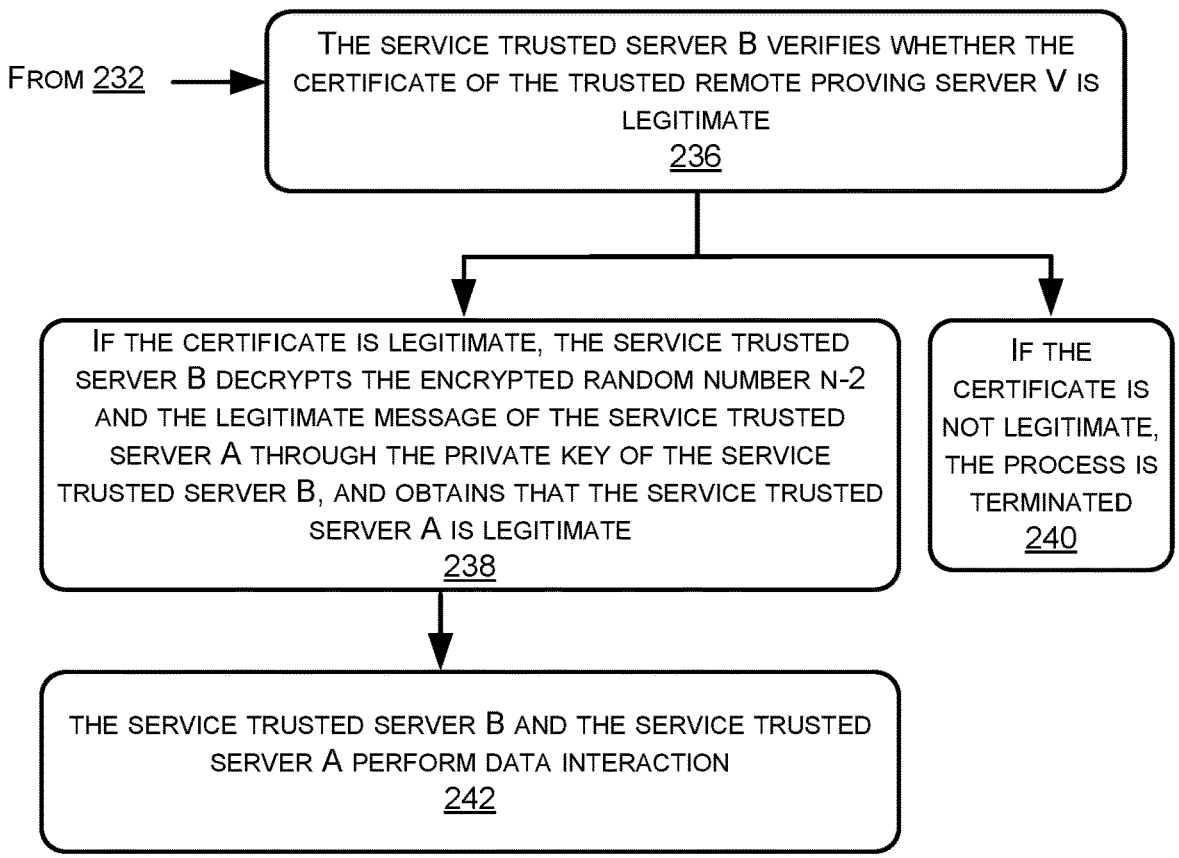
Figure 2E:
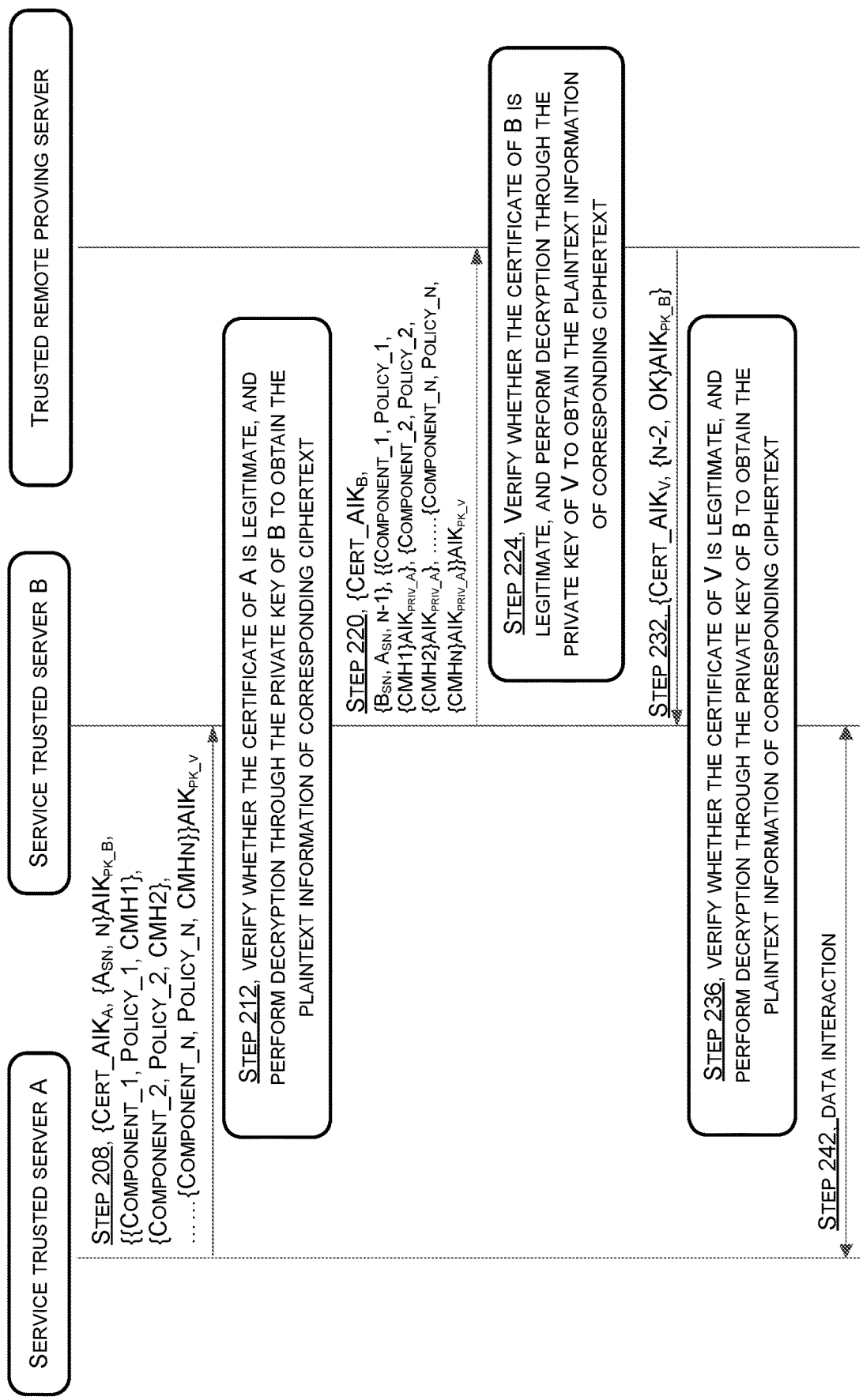
FIG. 2E is a digest diagram of the verification process.

As shown in FIGS. 2A-2E, FIGS. 2A-2D are schematic diagrams of a verification process 200 in a trusted remote proving system according to Embodiment 1 of the present application, and FIG. 2E is a digest diagram of the verification process 200.

In the trusted remote proving phase, on the service trusted server A side:

Step 202, the service trusted server A generates a random number n.

Step 204, the service trusted server A processes the serial number $A_{SN}$ and the random number n of the service trusted server using the public key $AIK_{pk\_B}$ of the service trusted server B, and encrypt respective component and the metric policy identifier corresponding to respective component by the platform identity public key $AIK_{pk\_v}$ of the trusted remote proving server V.

Step 206, the service trusted server A generates the challenge request using the certificate of the service trusted server A, the random number n, the serial number $A_{SN}$ of the service trusted server and the random number n that are encrypted through the public key $AIK_{pk\_B}$ of the service trusted server B, and respective component and the metric policy identifier corresponding to respective component that are encrypted through the platform identity public key $AIK_{pk\_v}$ of the trusted remote proving server V.

Step 208, the service trusted server A sends the challenge request to the service trusted server B.

The challenge request of the service trusted server A may be expressed as follows:

{Cert_$AIK_A$, {$A_{SN}$, n}$AIK_{pk\_B}$,
{Component_1, Policy_1, CMH1}, {Component_2, Policy_2, CMH2}, . . . {Component_n, Policy_n, CMHn} $AIK_{pk\_v}$ wherein {{Component_1, Policy_1, CMH1}, {Component_2, Policy_2, CMH2}, . . . {Component_n, Policy_n, CMHn} $AIK_{pk\_v}$ represent respective component and the metric policy identifier corresponding to respective component encrypted through the platform identity public key AIKpk_v of the trusted remote proving server V, where the component metric hash values (Component_Metri_Hash) CMH1 to CMHn are encrypted through the private key of the service trusted server A $AIK_{priv\_A}$.

On the service trusted server B side:

Step 210, the service trusted server B receives the challenge request of the service trusted server A;

Step 212, the service trusted server B verifies whether the certificate of the service trusted server A in the challenge request is legitimate. If the certificate is legitimate, Step 214 is performed. If the certificate is not legitimate, the process 200 is terminated at block 216.

Step 214, the serial number $A_{SN}$ and the random number n of the service trusted server A encrypted through the service trusted server B public key in the challenge request is decrypted through the private key of the service trusted server B, to obtain the serial number $A_{SN}$ of the service trusted server A and the random number n.

Step 218, a verification request is generated, where the service trusted server B generates the verification request according to the certificate Cert_$AIK_B$ of the service trusted server B, the serial number $B_{SN}$ of the service trusted server B, the serial number $A_{SN}$ of the service trusted server A, the random number n−1, and respective component and the metric policy identifier corresponding to respective component encrypted through the platform identity public key $AIK_{pk\_v}$ of the trusted remote proving server V.

Step 220, the verification request is sent to the trusted remote proving server V.

The verification request is as follows:

{Cert_$AIK_B$,
{$B_{SN}$, $A_{SN}$, n−1}, {{Component_1, Policy_1, {CMH1}$AIK_{priv\_A}$}, {Component_2, Policy_2, {CMH2}$AIK_{priv\_A}$}, . . . {Component_n, Policy_n, {CMHn}$AIK_{priv\_A}$}}$AIK_{pk\_v}$.

On the trusted remote proving server V side:

Step 222, the trusted remote proving server V receives the verification request.

Step 224, the trusted remote proving server V verifies whether the certificate of the service trusted server B is legitimate. If the certificate is legitimate, the process goes to Step 226. If the certificate is not legitimate, the operation is terminated at block 228.

Step 226, the trusted remote proving server V, through the private key of the trusted remote proving server V, decrypts respective component and the metric policy identifier corresponding to respective component encrypted through the platform identity public key $AIK_{pk\_v}$ of the trusted remote proving server V. The trusted remote proving server V also decrypts the ciphertext of the component hash value with the public key of the service trusted server A according to the serial number $A_{SN}$ of the service trusted server A to obtain {CMH1, CMH2, . . . , CMHn}.

Step 230, the trusted remote proving server V queries the policy library according to respective component and the metric policy identifier corresponding to the respective component of the service trusted server. The trusted remote proving server V compares the decrypted ciphertext of the component hash value with the component hash value in the policy library table to determine whether they are equal. If the decrypted ciphertext of the component hash value and the component hash value in the policy library table are equal, it is determined that the service trusted server A is legitimate, and Step 232 is performed. If the decrypted ciphertext of the component hash value and the component hash value in the policy library table are not equal, the process 200 is terminated at block 234.

Step 232, the trusted remote proving server V sends the verification response to the service trusted server B, where the verification response includes the certificate of the trusted remote proving server V, the random number n–2 encrypted through the service trusted server B public key, and the legitimate message of the service trusted server A.

The legitimate message is as follows:

{$Cert\_AIK_V$, {n–2, OK}$AIK_{pk\_B}$}.

On the service trusted server B side:

Step 236, the service trusted server B verifies whether the certificate of the trusted remote proving server V is legitimate. If the certificate is legitimate, Step 238 is performed. If the certificate is not legitimate, the process 200 is terminated at block 240.

Step 238, the service trusted server B decrypts the encrypted random number n–2 and the legitimate message of the service trusted server A through the private key of the service trusted server B, and obtains that the service trusted server A is legitimate.

Step 242, the service trusted server B and the service trusted server A perform data interaction.

FIG. 2E is a digest diagram of the verification process 200. FIG. 2E shows Steps 208, 212, 220, 224, 232, 236, and 343, which have been described above with reference to FIGS. 2A-2D and may not be repeated herein.

Based on the above, it should be noted that the above-mentioned random numbers n–1, n–2 are variant information of the random number n, which may be obtained by different variant algorithms. Here, only the above example is taken as an example for the sake of description. Other examples may be applicable as long as the trusted remote proving system provided in this application is achieved without specific limitation. The random numbers n–1, n–2 and the random number n are all to prevent man-in-the-middle attacks in the verification interaction, avoiding the problem of insecurity of plaintext transmission in the conventional techniques.

In addition, the above process is the verification of the platform identity and platform legitimacy of the service trusted server A by the service trusted server B. Similarly, the service trusted server A may also verify the platform identity and the platform legitimacy of the service trusted server B (in Step 218, the service trusted server B may transfer a newly added list of components of the service trusted server B, a list of policies used by the components, and respective metric results of the components to the service trusted server V). After receiving the information, the service trusted server V may simultaneously verify the platform identity and identity legitimacy of the service trusted servers A and B according to the same principle. The service trusted server V may simultaneously feed back the verification result {$Cert\_AIK_V$, {n–2, OK}$AIK_{pk\_B}$} to the service trusted server B and the verification result {$Cert\_AIK_V$, {n–2, OK}$AIK_{pk\_A}$} to the service trusted server A. In this way, two-way verification of the service trusted servers A and B is achieved. Subsequently, sensitive data interaction may be performed, of which the process is not repeated herein.

In the conventional techniques, based on the TPM remote proving protocol, assuming that there are three computers in the network, identities thereof are respectively denoted as $ID_1$, $ID_2$, and $ID_3$, where $ID_1$ represents the challenger, $ID_2$ represents the target, and $ID_3$ represents the privacy CA.

Figure 3:
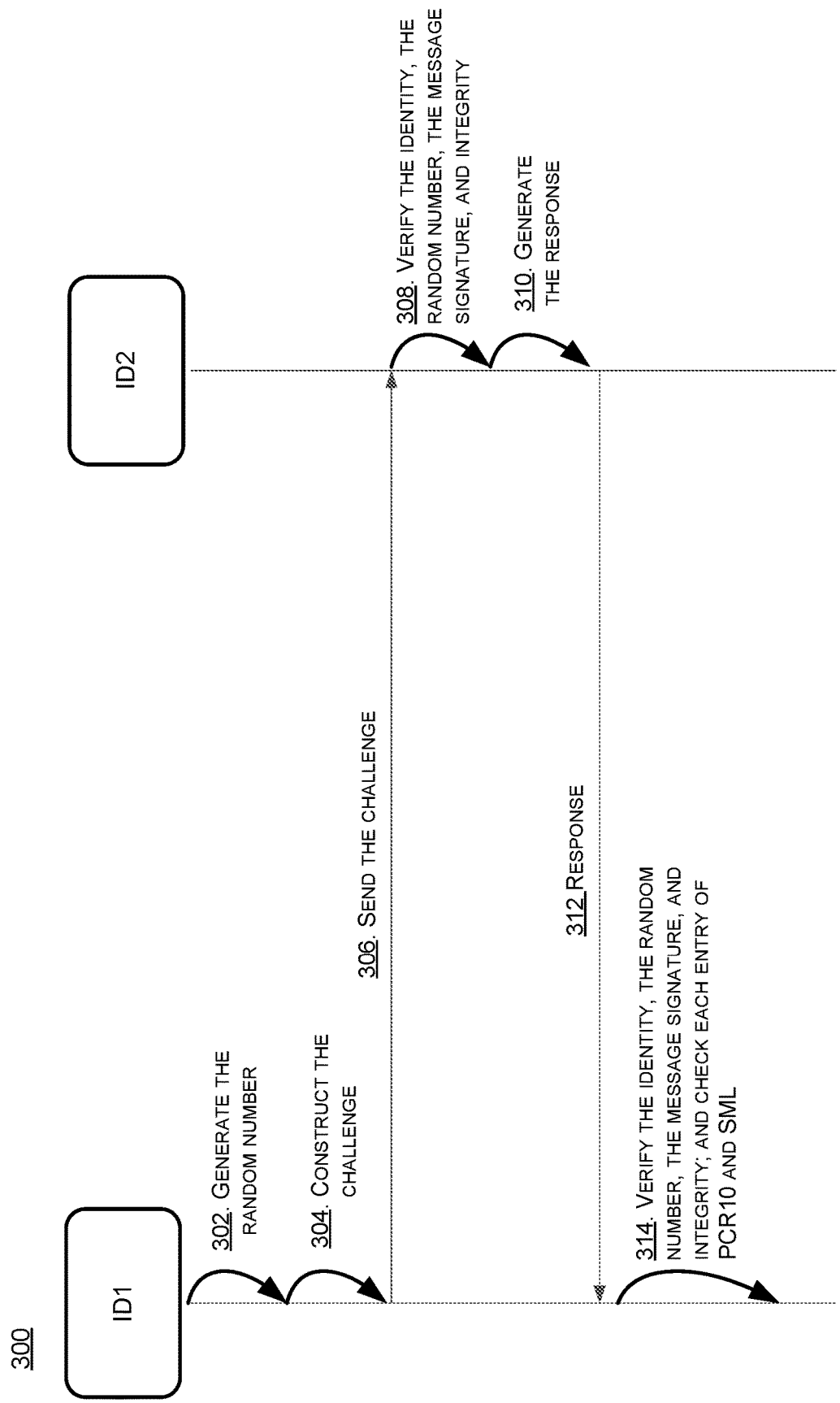
FIG. 3 is a schematic flowchart of remote proving initialization of TPM in the conventional techniques.

In the proving phase:

The proving phase is divided into three steps. FIG. 3 is a schematic flowchart 300 of the remote proving phase of the TPM in the conventional techniques. The process is shown in FIG. 3:

Step 302: $ID_1$ generates a random number $n_1$.

Step 304: $ID_1$ constructs a challenge {$ID_1$, $n_1$, Sig(h($ID_1$||$n_1$)}.

Step 306: $ID_1$ sends the challenge to $ID_2$.

Step 308: When $ID_2$ receives the challenge, $ID_2$ extracts the identity $ID_1$ and random number $n_1$ of the sender of the message.

Step 310: The $ID_2$ generates a response. The response is recorded as: {$ID_2$, $n_1$, $n_2$, SML, $PCR_{10}$, Quote, Sig(h($ID_2$||$n_1$||n2||SML||$PCR_{10}$||Quote}.

Step 312: The $ID_2$ sends the response to $ID_1$.

Step 314: When $ID_1$ receives the response, $ID_1$ first extracts the identity $ID_2$ and random numbers $n_1$ and $n_2$ of the message sender, and uses the public key of $ID_2$ to verify the signature of the message and the integrity of the message. Then, $ID_1$ verifies the signature of Quote. Next, a piece of stored metric log SML recalculates $PCR_{10}$ to verify the integrity of the SML. Finally, the $PCR_{10}$ is compared with the reference value, and each entry in the SML is checked one by one.

$ID_i$ is an identity of the protocol participant. AIK is the identity certificate key of the TPM. $AIK_{pk}$ is the public key part of AIK. $AIK_{sk}$ is the private key part of the AIK. h: SHA-1 hash function. ||: string concatenation operation. $PCR_i$: the i-th platform configuration register. Ti is the TPM module of $ID_i$. SML is a stored metric log file.

From the above, it can be seen that the TPM-based remote proving protocol has the following disadvantages:

In the TPM-based remote proving mechanism, SML or $PCR_{10}$ is transmitted in plaintext during transmission. During the transmission, if the information were intercepted, the privacy thereof would be leaked. At the same time, because the transmission is completely open to the challenger, no privacy protection is provided with regard to the challenger.

In view of the above, in the trusted remote proving system provided by the present application, because of the attribute information of the service trusted server, such as respective component and the policy identifier corresponding to respective component, and because the corresponding measurement algorithm are transmitted through encryption, it is ensured that the privacy information of the service trusted server platform may not be leaked.

In the example embodiments of the present application, the first service trusted server, the second service trusted server, and the trusted remote proving server are used. the second service trusted server is configured to receive a challenge request sent by the first service trusted server; obtain to-be-verified information of the first service trusted server in the challenge request; send the verification request to the trusted remote proving server, where the verification request includes the to-be-verified information of the first service server; and obtain the verification response returned by the trusted remote proving server. the trusted remote proving server is configured to receive the verification request sent by the second service trusted server, where the verification request includes the to-be-verified information of the first service server. the trusted remote proving server is further configured to return the corresponding verification response to the second service trusted server according to the verification request. The purpose of securing the privacy information of the service trusted server platform is achieved, thereby realizing the technical effect of improving the security of information transmission. The technical problem of affecting the operation of the server terminal during the policy deployment and the information security issue caused by the plaintext transmission in the remote proving mechanism of the conventional techniques is solved.

In addition, the trusted remote proving system provided by this application in the initialization phase of the trusted remote proving mechanism is as follows:

In an example embodiment, the trusted remote proving system further includes a trusted policy management server (not shown). Before the second service trusted server 104 receives the challenge request sent by the first service trusted server 102, the trusted policy management server receives the platform metric policy request sent by the first service trusted server 102 and the second service trusted server 104 respectively; and return the corresponding platform metric policy response according to the platform metric policy request, so that the first service trusted server 102 and the second service trusted server 104 perform policy configuration according to the platform metric policy response.

Figure 4A:
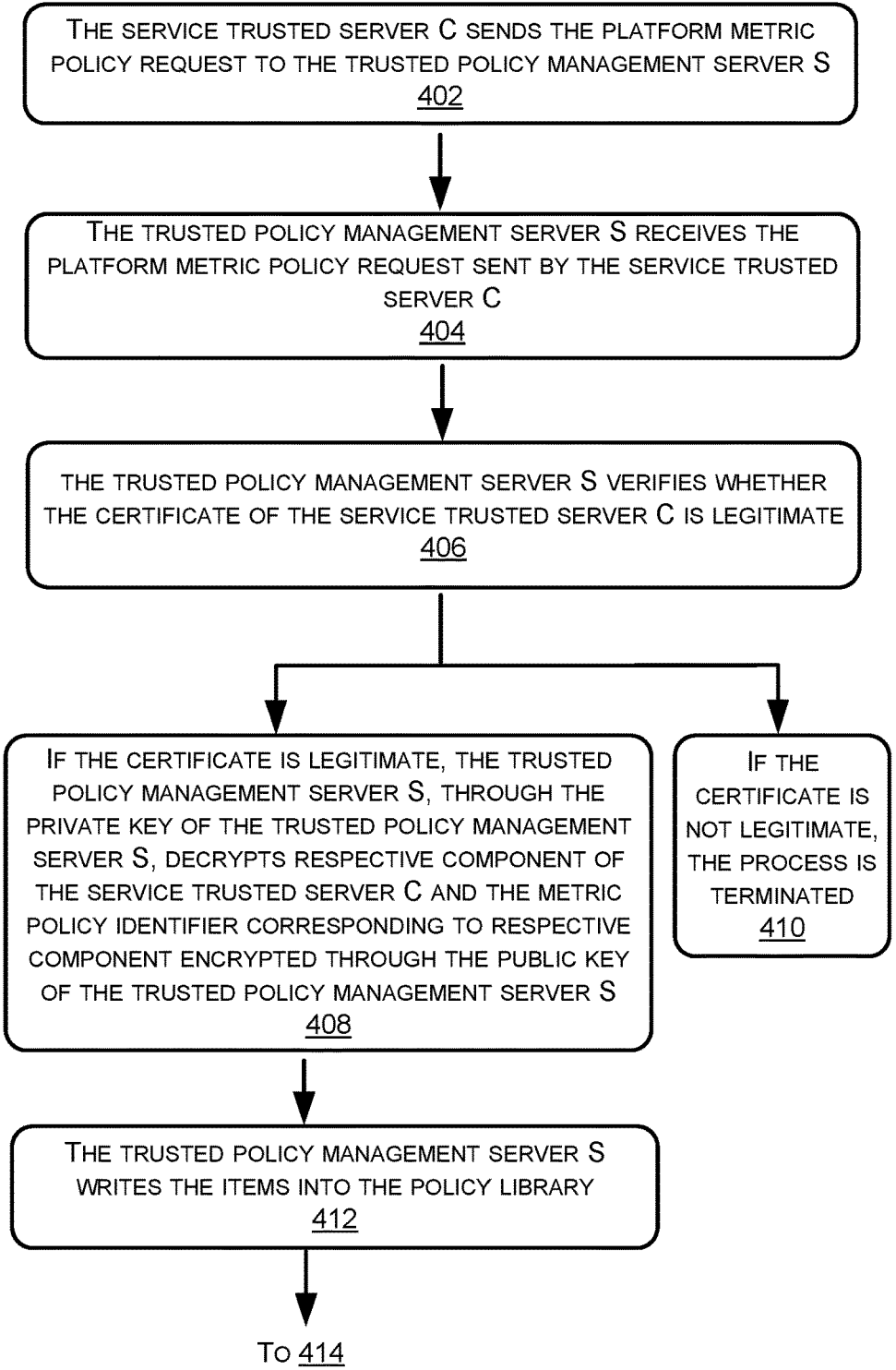
FIGS. 4A and 4B are schematic diagrams of an initialization process in a trusted remote proving system according to Embodiment 1 of the present application.
Figure 4B:
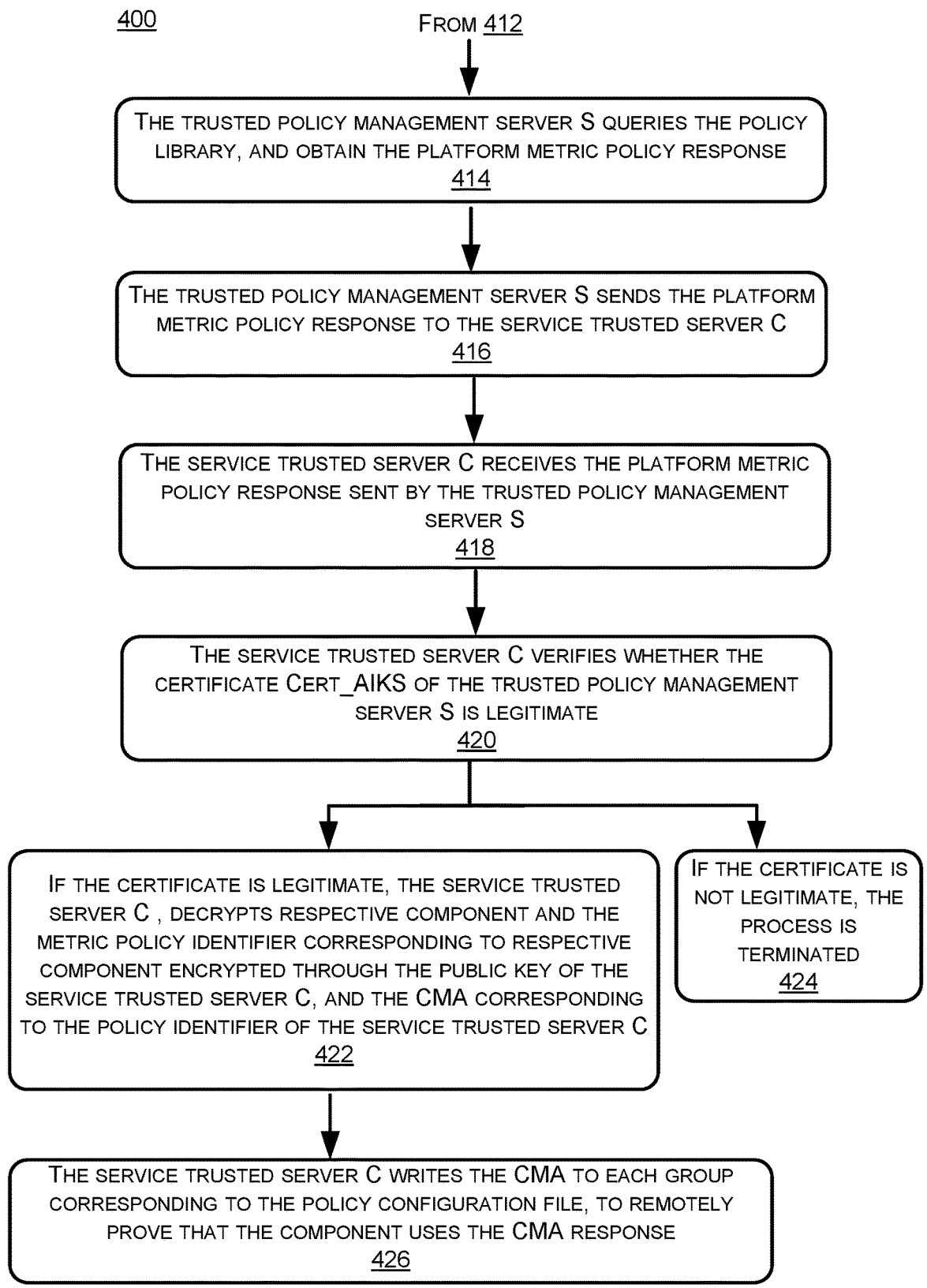
Figure 4C:
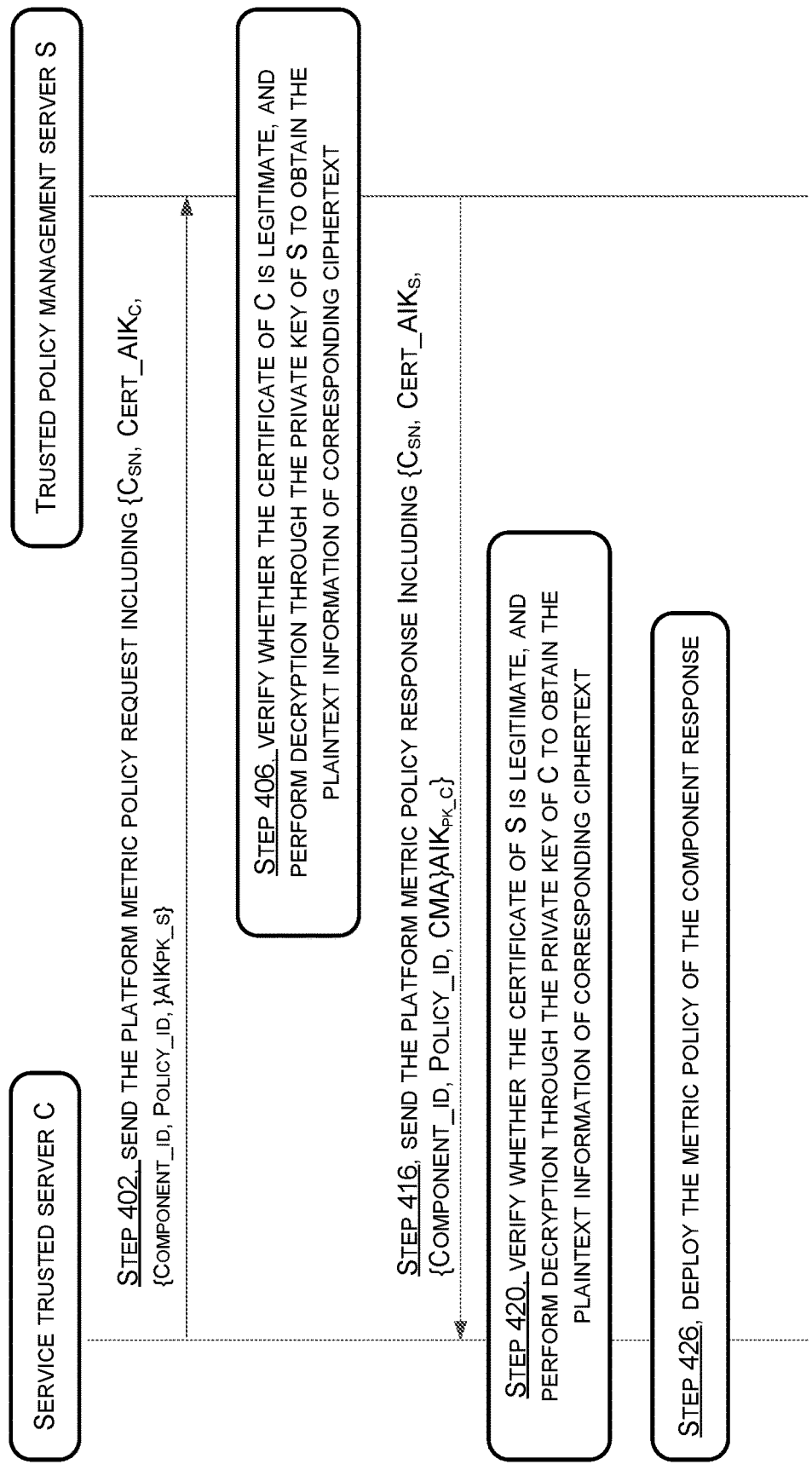
FIG. 4C is a digest diagram of the initialization process.

In an example embodiment, as shown in FIGS. 4A-4C, FIGS. 4A and 4B are schematic diagrams of an initialization process 400 in a trusted remote proving system according to Embodiment 1 of the present application. FIG. 4C is a digest diagram of the initialization process 400.

Take the service trusted server as an example, the service trusted server is marked as the service trusted server C, and the trusted policy management server is marked as the trusted policy management server S. On the service trusted server side:

Step 402, the service trusted server C sends the platform metric policy request to the trusted policy management server S.

The platform metric policy request includes the serial number $C_{SN}$ of the service trusted server C, the certificate Cert_AIK$_C$ of the service trusted server C, and respective component of the service trusted server C and the metric policy identifier corresponding to the respective component encrypted through the public key of the trusted policy management server S.

Here, if respective component of the service trusted server C and the metric policy identifier corresponding to respective component is unknown, respective component of the service trusted server C and the metric policy identifier corresponding to respective component may be obtained by querying the policy service center, or by requesting the policy service center to be newly created for the service trusted server C. In Step 402, it is assumed that the service trusted server C has obtained respective component of the service trusted server C and the metric policy identifier corresponding to respective component.

The platform metric policy request includes the following:

{$C_{SN}$, Cert_AIK$_C$,
{Component_id, Policy_id,}AIKpk_s}.

On the trusted policy management server S side:

Step 404, the trusted policy management server S receives the platform metric policy request sent by the service trusted server C.

Step 406, the trusted policy management server S verifies whether the certificate of the service trusted server C is legitimate. If the certificate is legitimate, Step 408 is performed. If the certificate is not legitimate, the process 400 is terminated at block 410.

Step 408, the trusted policy management server S, through the private key of the trusted policy management server S, decrypts respective component of the service trusted server C and the metric policy identifier corresponding to respective component encrypted through the public key of the trusted policy management server S.

Step 412, the trusted policy management server S writes the following items into the policy library, i.e., respective component of the service trusted server C and the metric policy identifier corresponding to respective component, component metric algorithm (Component_Metri_Algorithm, CMA for short), component hash value (Component_Metri_Hash, CMH for short), and the attribute description of a software or hardware component (Component_attribute, CA for short) of the service trusted server.

Step 414, the trusted policy management server S queries the policy library according to the comparative component of the service trusted server C and the metric policy identifier corresponding to the component, to obtain the CMA and CMH corresponding to the policy identifier of the service trusted server C. The trusted policy management server S, through the public key of the service trusted server C, encrypts the respective component of the service trusted server C and the metric policy identifier corresponding to the service trusted server C, the CMA and the CMH corresponding to the policy identifier of the service trusted server C, to obtain the platform metric policy response. The platform metric policy response further includes a serial number $C_{SN}$ of the service trusted server C and the certificate Cert_AIK$_S$ of the trusted policy management server S.

Step 416, the trusted policy management server S sends the platform metric policy response to the service trusted server C.

The platform metric policy response includes the following:

{$C_{SN}$, Cert_AIK$_S$, {Component_id, Policy_id, CMA} AIK$_{pk\_C}$}.

On the service trusted server C side:

Step 418, the service trusted server C receives the platform metric policy response sent by the trusted policy management server S.

Step 420, the service trusted server C verifies whether the certificate Cert_AIK$_S$ of the trusted policy management server S is legitimate. If the certificate is legitimate, Step 422 is performed. If the certificate is not legitimate, the process 400 is terminated at block 424.

Step 422, the service trusted server C, through the private key $AIK_{priv\_C}$ of the service trusted server C, decrypts respective component and the metric policy identifier corresponding to respective component encrypted through the public key of the service trusted server C, and the CMA corresponding to the policy identifier of the service trusted server C, to obtain respective component of the service trusted server C and the metric policy identifier corresponding to respective component, and the CMA corresponding to the policy identifier of the service trusted server C.

Step 426, the service trusted server C writes the CMA to each group corresponding to the policy configuration file, to remotely prove that the component uses the CMA response. That is, the metric policy of the component response is deployed.

FIG. 4C is a digest diagram of the verification process 400. FIG. 4C shows Steps 402, 406, 416, 420, and 426, which have been described above with reference to FIGS. 4A and 4B and may not be repeated herein.

In conventional techniques, based on the TPM remote proving protocol, assuming that there are three computers in the network, identities thereof are respectively denoted as $ID_1$, $ID_2$, and $ID_3$, where $ID_1$ represents the challenger, $ID_2$ represents the target, and $ID_3$ represents the privacy CA.

Figure 5:
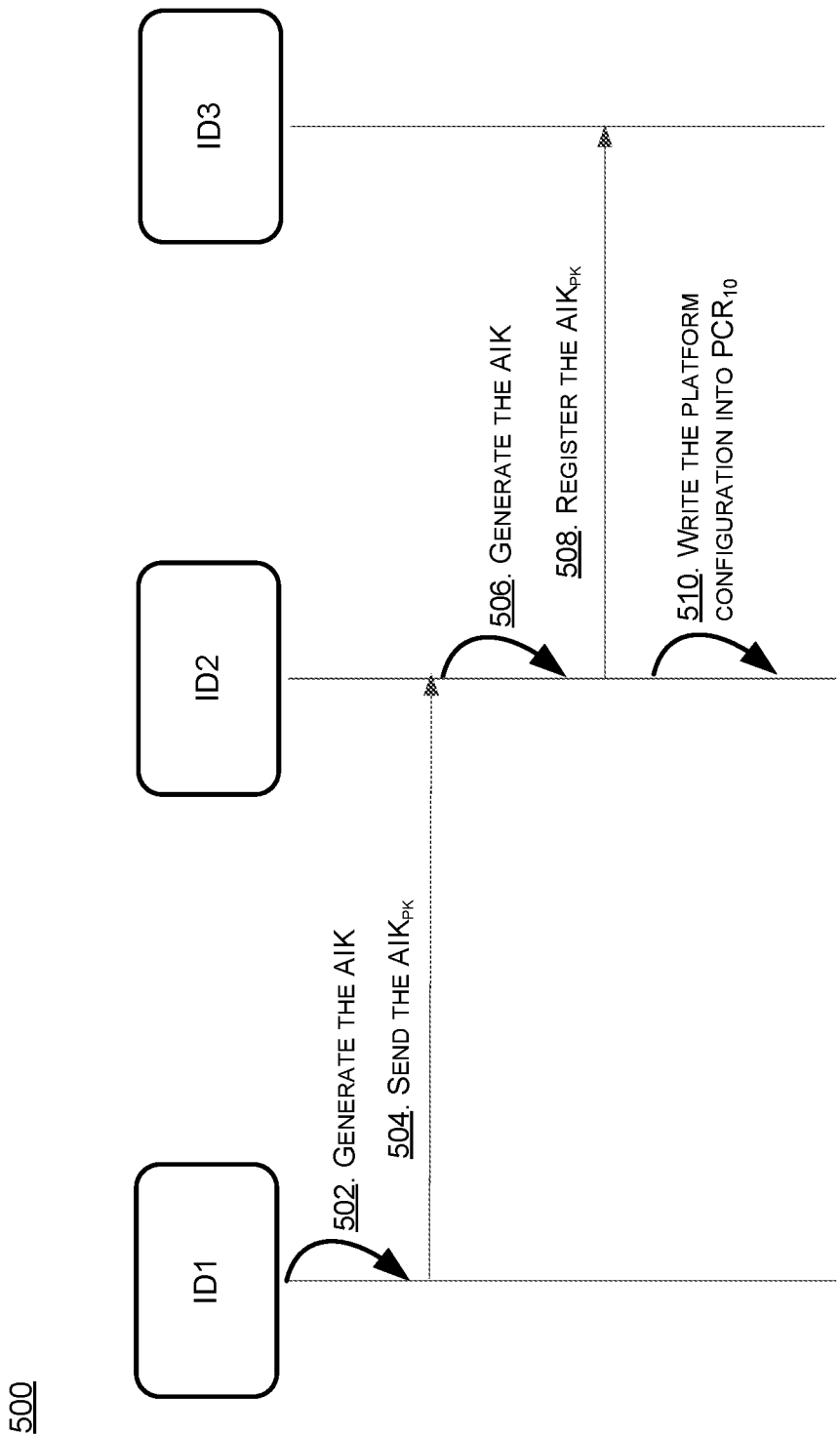
FIG. 5 is a schematic flowchart of a remote proving phase of TPM in the conventional techniques.

In the initialization phase:

The initialization phase is shown in FIG. 5. FIG. 5 is a schematic flowchart of remote proving initialization process 500 of the TPM in the conventional techniques.

Step 502, the identity $ID_1$ of the protocol participant generates the identity certificate key AIK of the TPM.

Step 504, the identity $ID_1$ sends the public key $AIK_{pk}$ of the AIK to certain software or hardware component attribute description (Component_attribute, CA for short) of the privacy service trusted server.

Step 506, $ID_2$ generates the $AIK_p k$.

Step 508, $ID_2$ sends $AIK_{pk}$ to privacy CA $ID_3$ to register the identity thereof.

Step 510, $ID_2$ writes the platform configuration information to the 10th platform configuration register, $PCR_{10}$.

From the above, it can be seen that the TPM-based remote proving protocol has the following disadvantages:

In the TPM-based remote proving mechanism, when the deployment checking policy is initialized, the platform configuration reference values are written into the PCR of the TPM and will take effect after started. Regarding BIOS, BMC and other firmware, and regarding the scenario where the system OS kernel or application software is constantly updated, due to the update of the platform configuration and system software and hardware, the checking policy is updated and the device is restarted, which makes the checking policy management difficult, and causes the interruption of business operations. Also, due to the update error of the checking policy, the check fails, and the system does not start up.

In view of the above, in order to overcome the deficiencies in the conventional techniques, in the trusted remote proving system provided by the present application, the service trusted server centrally deploys the metric policy through the trusted policy management server and the policy service center in which the trusted policy management server is located. The corresponding checking policy management and execution are performed by the policy service center. Therefore, the service trusted server may be prevented from updating the configuration of the checking policy locally because of changes in the hardware and software configuration of the platform system. Moreover, it is possible to avoid the scenario where local execution errors are caused by the checking policy configuration error, eventually resulting in that the system cannot start up.

In view of the above, in the trusted remote proving system provided by the present application, the service trusted server C, the trusted policy management service center server S, and the trusted remote proving service center server V have all obtained respective platform certificates $Cert\_AIK_C$, $Cert\_AIK_S$, and $Cert\_AIK_V$ from the PCA (platform certificate issuing center of the service server cluster). The respective platform public keys are $AIK_{pk\_C}$, $AIK_{pk\_S}$, and $AIK_{pk\_V}$. The respective platform private keys $AIK_{priv\_S}$, $AIK_{priv\_S}$, and $AIK_{priv\_V}$ are stored in respective TPM chips. PCA also has its own platform identity certificate $Cert\_AIK_{PCA}$, and the platform identity public key $AIK_{pk\_PCA}$ and private key $AIK_{priv\_PCA}$.

Moreover, in the service system, the trusted server cluster in an example embodiment maintains services such as creation, deletion, update, query, storage, automatic update detection, and delivery of the service trusted policy.

In addition, in the trusted remote proving system provided by the present application, the trusted remote proving service center and the policy service center share the organization policy library of software and hardware of respective server in the service server cluster. One of the policies in the policy library includes the following fields:

CSN: the serial number of the service trusted server SN.

Component_id: the id number of a software or hardware component of the service trusted server.

Policy_id: the id identifier of a certain metric policy.

CA (Component_attribute): the attribute description of a software or hardware component of the service trusted server.

CMA (Component_Metri_Algorithm): the component metric algorithm.

CMH (Component_Metri_Hash): the component hash value.

Here, the metric policy library table records applied by the various components of the server are as shown in Table 1:

TABLE 1

| Policy_id | SN | Component_id | CMA | CMH | CA |
|---|---|---|---|---|---|
| 1 | 123456 | 1 | SHA-1 | hash value 1 | BIOS firmware |
| 2 | 123456 | 2 | SHA-3 | hash value 2 | graphic card firmware |
| 3 | 123376 | 1 | SM3 | hash value 3 | BIOS firmware |

The trusted server with the SN of 123456 apply the metric strategy 1 and the metric strategy 2 on its BIOS and graphic card firmware respectively. These two metric strategies use different metric algorithms to obtain two different metric hash values.

The trusted remote proving system provided by this application proposes an architecture, method, and system based on TPM remote proving. That is, the service trusted server centrally deploys metric policies through the policy service center, while the corresponding checking policy management and execution are performed by the policy service center. Based on the above solution, the service trusted server may be prevented from updating the configuration of the checking policy locally because of changes in the hardware and software configuration of the platform system. Moreover, it is possible to avoid the scenario where local execution errors are caused by the checking policy configuration error, eventually resulting in that the system cannot start up. The leakage of the privacy information of the service trusted server platform may be prevented during the information transmission.

Embodiment 2

According to an embodiment of the present application, an embodiment of a trusted remote proving method is also provided. It should be noted that the steps illustrated in the flowchart of the figures may be performed in a computer system such as a set of computer-executable instructions. Also, although logical sequences are shown in the flowcharts, in some cases the steps shown or described may be performed in a different order than the order described herein.

Figure 6:
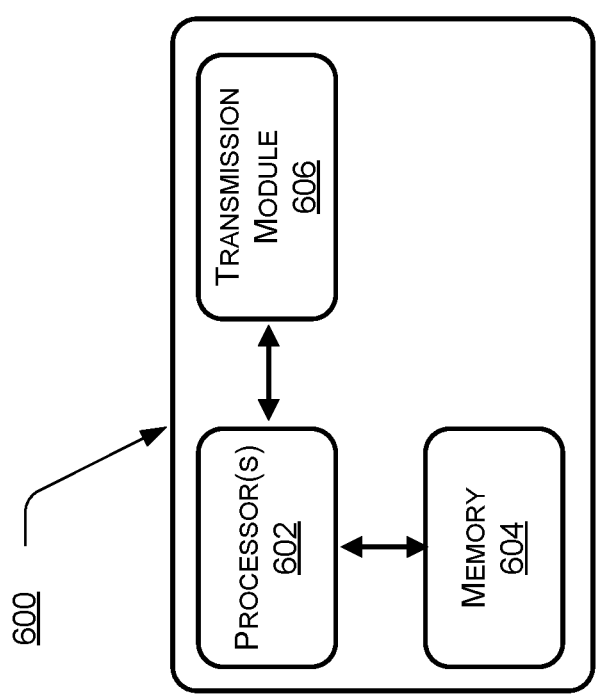
FIG. 6 is a hardware structural block diagram of a server terminal of a trusted remote proving method according to an embodiment of the present application.

The method embodiment provided in Embodiment 1 of the present application may be executed in a mobile terminal, a server terminal, or the like. For example, the method is operated on the server terminal. FIG. 6 is a block diagram of the hardware structure of a server terminal 600 of a trusted remote proving method according to an embodiment of the present application. As shown in FIG. 6, server terminal 600 may include one or more (only one is shown) processor(s) 602 (processor(s) 602 may include, but is not limited to, a processing device such as a microprocessor MCU or a programmable logic device FPGA), a memory 604 for storing data, and a transmission module 606 for performing communication functions. A person of ordinary skill in the art may understand that the structure shown in FIG. 6 is merely illustrative and does not limit the structure of the above electronic device. For example, server terminal 600 may also include more or fewer components than the components shown in FIG. 6, or have a different configuration than that shown in FIG. 6.

The memory 604 may be used to store software programs and modules of the application software, such as program instructions/modules corresponding to the trusted remote proving method In the example embodiments of the present application. The processor(s) 602 executes various functional applications and data processing by executing software programs and modules stored in the memory 604, that is, implementing the trusted remote proving method of the above application. The memory 604 may include high-speed random access memory, and may also include non-volatile memory, such as one or more magnetic storage devices, flash memory, or other non-volatile solid-state memory. In some examples, the memory 604 may further include a memory remotely located with respect to the processor(s) 602. These remote memories may be connected to the server terminal 600 via a network. Examples of the above network include, but are not limited to, the Internet, an intranet, a local area network, a mobile communication network, and combinations thereof.

The transmission module 606 is configured to receive or transmit data via a network. Specific examples of the above network may include a wireless network provided by a communication provider of the server terminal 600. In an example, the transmission module 606 includes a Network Interface Controller (NIC) that may be connected to other network devices through a base station to communicate with the Internet. In an example, the transmission module 606 may be a radio frequency (RF) module which is configured to communicate with the Internet wirelessly.

Figure 7B:
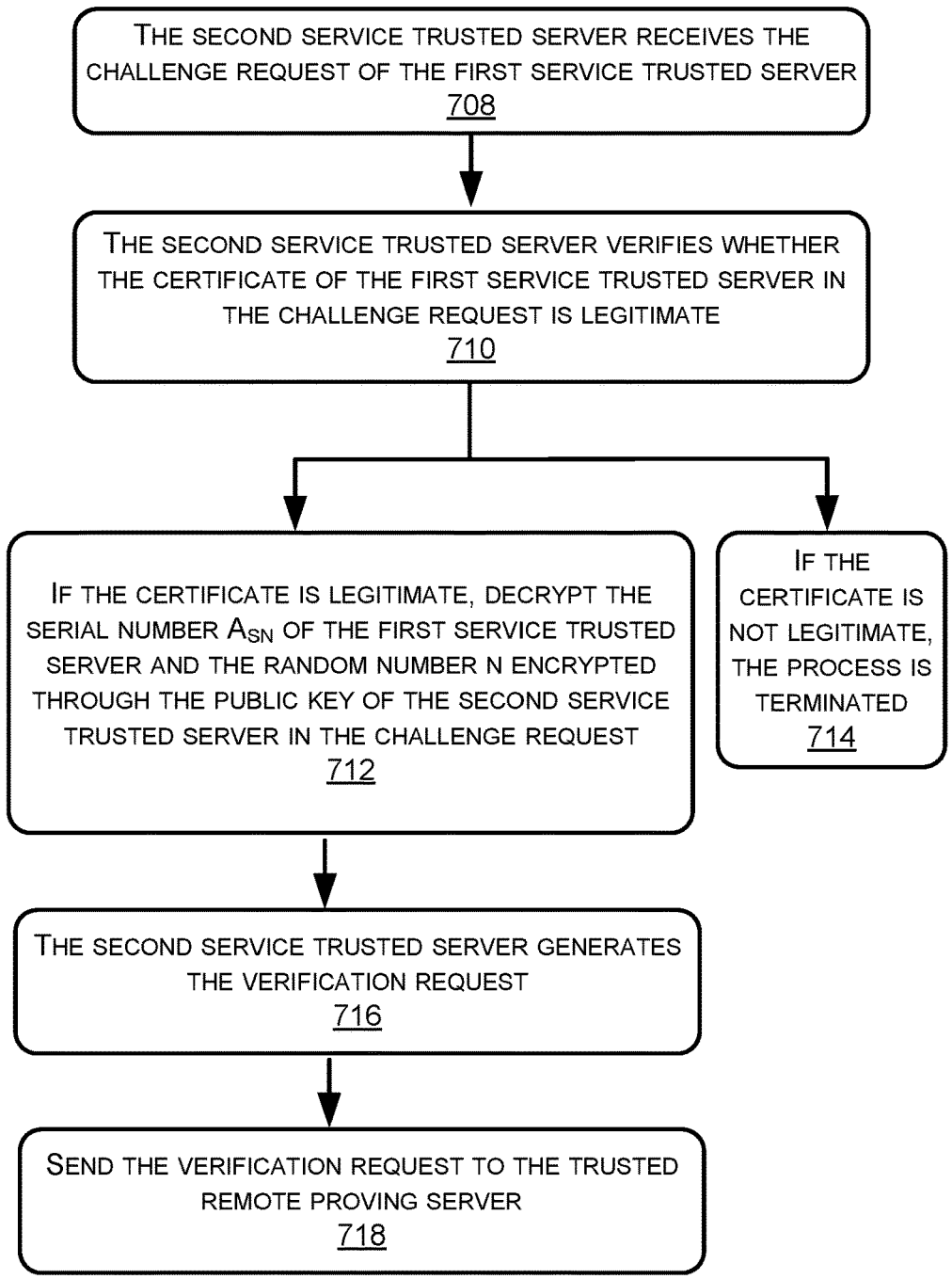
Figure 7C:
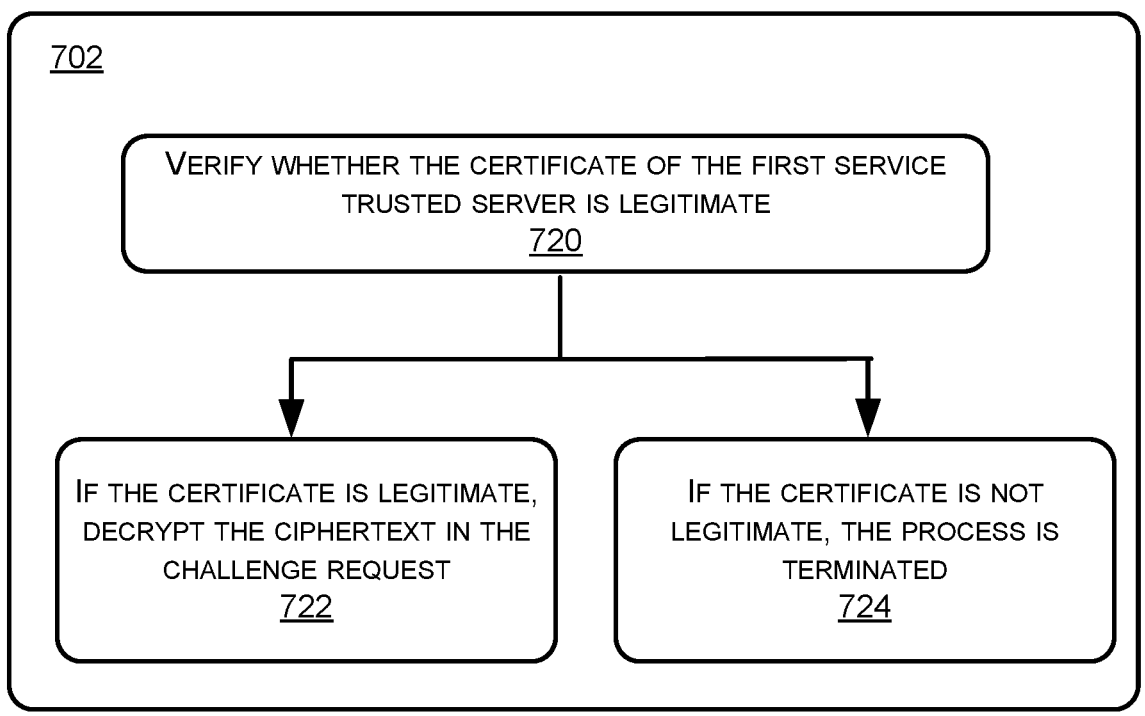
Figure 7F:
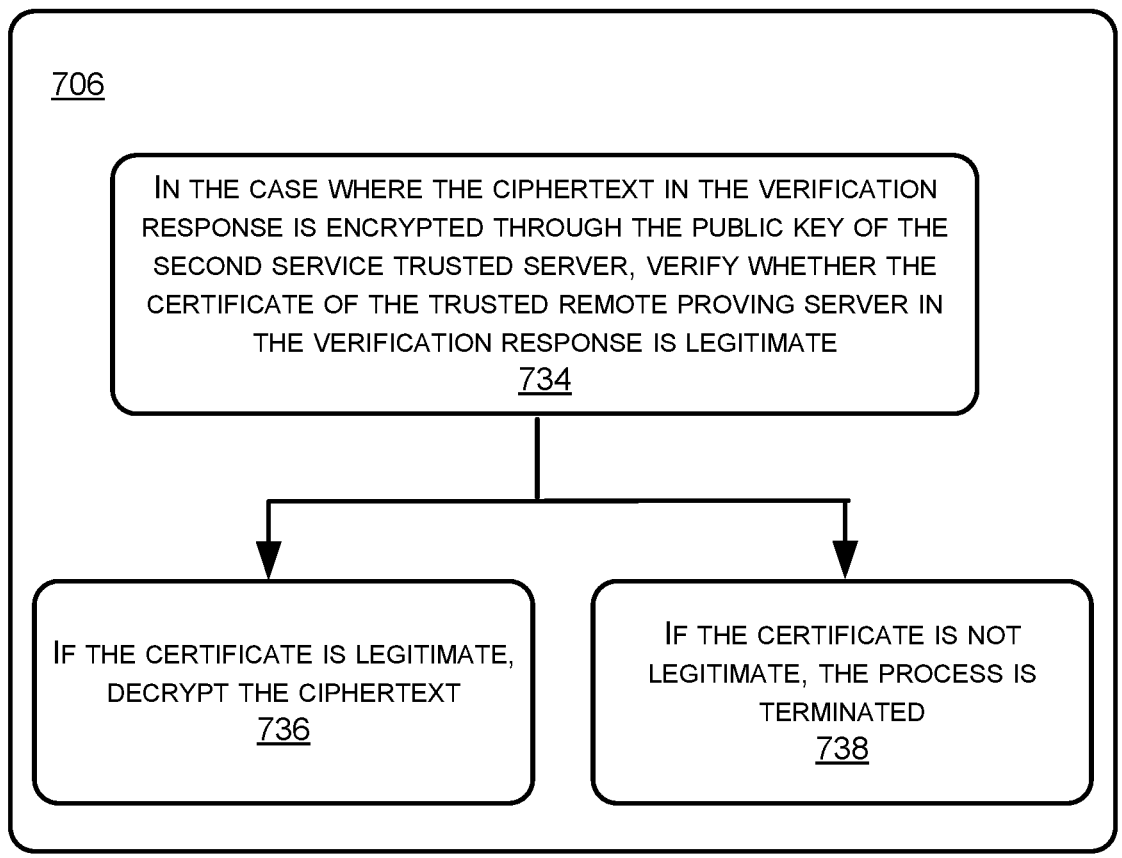
Figure 7G:
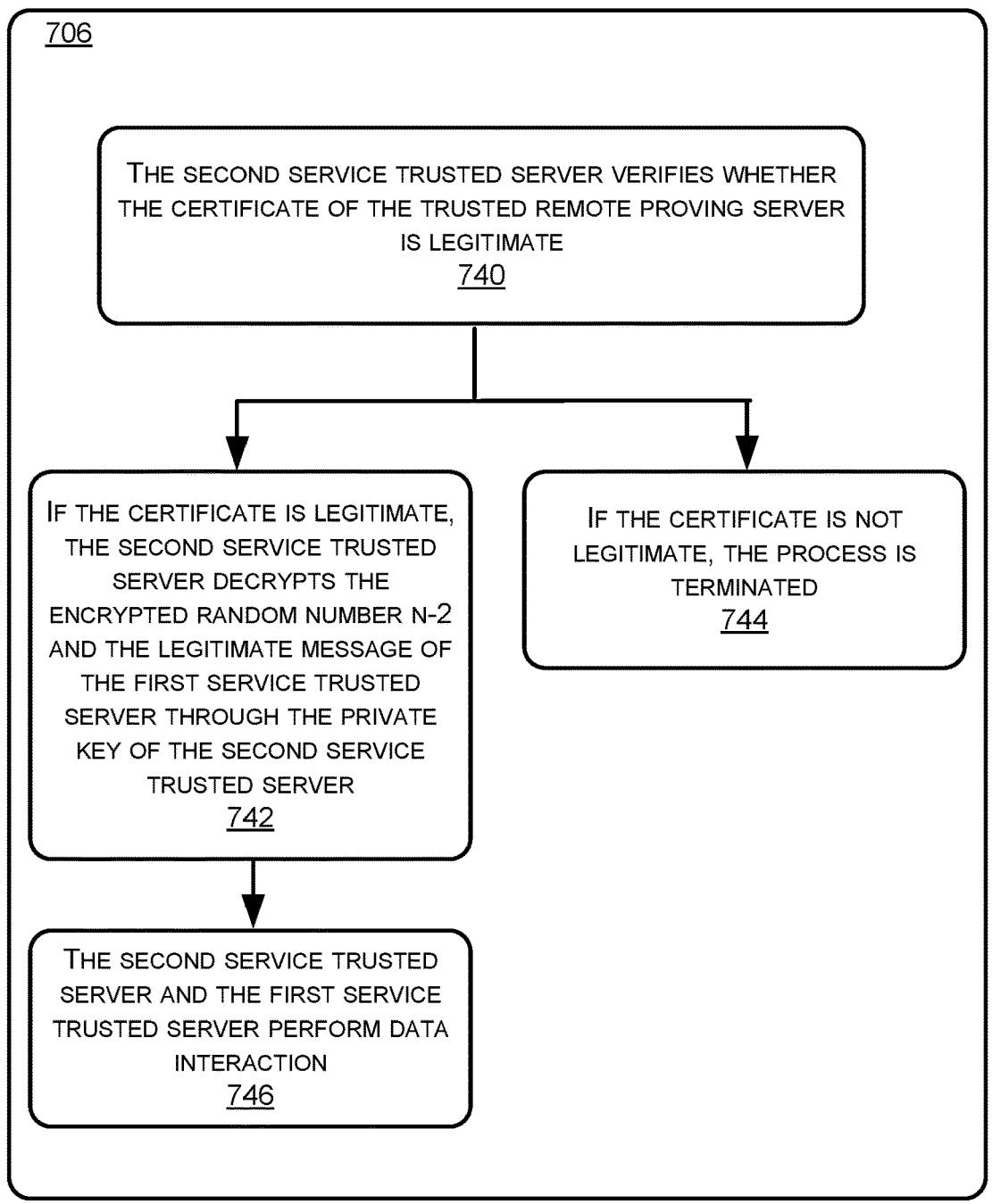

In the above operating environment, the present application provides a trusted remote proving method 700 as shown in FIGS. 7A-7I. On the side of the second service trusted server, FIG. 7A is a flowchart of the trusted remote proving method 700 according to the second embodiment of the present application.

Step 702, the challenge request sent by the first service trusted server is received. The to-be-verified information of the first service trusted server in the challenge request is obtained.

Step 704, the verification request is sent to the trusted remote proving server, where the verification request includes the to-be-verified information of the first service server.

Step 706, the verification response returned by the trusted remote proving server is obtained.

In an example embodiment, the trusted remote proving method provided by the application, on the second service trusted server side, corresponds to the second service trusted server 104 in Embodiment 1. With reference to Steps S702 to S706, in the process of trusted remote proving, the second service trusted server side may perform the following:

Step 708, the second service trusted server receives the challenge request of the first service trusted server.

Step 710, the second service trusted server verifies whether the certificate of the first service trusted server in the challenge request is legitimate. If the certificate is legitimate, Step 712 is performed. If the certificate is not legitimate, the process is terminated at block 714.

Step 712, the serial number $A_{SN}$ of the first service trusted server and the random number n encrypted through the public key of the second service trusted server in the challenge request is decrypted through the private key of the second service trusted server, to obtain the serial number $A_{SN}$ of the first service trusted server and the random number n.

Step 716, the verification request is generated. The second service trusted server generates the verification request according to the certificate $Cert\_AIK_B$ of the second service trusted server, the serial number $B_{SN}$ of the second service trusted server, the serial number $A_{SN}$ of the first service trusted server, the random number n−1, and respective component and the metric policy identifier corresponding to respective component encrypted through the platform identity public key $AIK_{pk\_v}$ of the trusted remote proving server.

Step 718, the verification request is sent to the trusted remote proving server.

In the example embodiments of the present application, the challenge request sent by the first service trusted server is received. The to-be-verified information of the first service trusted server in the challenge request is obtained. The verification request is sent to the trusted remote proving server, where the verification request includes the to-be-verified information of the first service server. The verification response returned by the trusted remote proving server is obtained. The purpose of securing the privacy information of the service trusted server platform is achieved, thereby realizing the technical effect of improving the security of information transmission. Thus, the technical problem of affecting the operation of the server terminal during the policy deployment and the information security issue caused by the plaintext transmission in the remote proving mechanism of the conventional techniques is solved.

In an example embodiment, the challenge request includes the certificate of the first service trusted server, the serial number of the first service trusted server and the first random number encrypted through the public key of the second service trusted server, and respective component of the first service trusted server and corresponding metric policy identifier encrypted through the public key of the trusted remote proving server.

Furthermore, Step S702 in which the to-be-verified information of the first service trusted server in the challenge request is obtained includes the following:

Step 720, whether the certificate of the first service trusted server is legitimate is verified.

Step 722, in the case where the verification result is legitimate, the ciphertext in the challenge request is decrypted through the private key of the second service trusted server, to obtain the to-be-verified information, where the to-be-verified information includes the serial number of the first service trusted server and the random number.

Step 724, in the case where the verification result is not legitimate, the operation is terminated.

In an example embodiment, Step S704 in which the verification request is sent to the trusted remote proving server includes the following:

Step 726, in the case where the to-be-verified information further includes respective component of the first service trusted server and corresponding metric policy identifier encrypted through the public key of the trusted remote proving server, the verification request is generated according to the certificate of the second service trusted server, the serial number of the second service trusted server, the second random number, the serial number of the first service trusted server, and respective component of the first service trusted server and corresponding metric policy identifier encrypted through the public key of the trusted remote proving server.

Step 728, the verification request is sent to the trusted remote proving server.

Furthermore, in an example embodiment, it is assumed that in the process of two-way verification, Step S704 in which the verification request is sent to the trusted remote proving server includes the following:

Step 730, in the case where the to-be-verified information further includes respective component of the second service trusted server and corresponding metric policy identifier encrypted through the public key of the trusted remote proving server, the verification request is generated according to the certificate of the second service trusted server, the serial number of the second service trusted server, the second random number, the serial number of the first service trusted server, respective component of the first service trusted server and corresponding metric policy identifier encrypted through the public key of the trusted remote proving server, and respective component of the second service trusted server and corresponding metric policy identifier encrypted through the public key of the trusted remote proving server.

Step 732, the verification request is sent to the trusted remote proving server.

In an example embodiment, based on Step 716, on the basis of verifying the first service trusted server, the second service trusted server sends the newly added component list of the second service trusted server, the policy list used by the component, and the list of respective metric result of the component to the trusted remote proving server.

In an example embodiment, Step S706 in which the verification response returned by the trusted remote proving server is obtained includes the following:

Step 734: in the case where the ciphertext in the verification response is encrypted through the public key of the second service trusted server, whether the certificate of the trusted remote proving server in the verification response is legitimate is verified.

Step 736, in the case where the verification result is legitimate, the ciphertext is decrypted through the private key of the second service trusted server, to obtain the identity of the first service trusted server and the legitimacy of the platform where the first service trusted server is located.

Step 738, in the case where the verification result is not legitimate, the process 700 is terminated.

In an example embodiment, with reference to Step 724 to Step 738, with reference to Steps 232-242 in the proving process in Embodiment 1, Step 706 in which the verification response returned by the trusted remote proving server is obtained includes the following:

Step 740, the second service trusted server verifies whether the certificate of the trusted remote proving server is legitimate, If the certificate is legitimate, Step 742 is performed. If the certificate is not legitimate, the process 700 is terminated at block 744.

Step 742, the second service trusted server decrypts the encrypted random number n−2 and the legitimate message of the first service trusted server through the private key of the second service trusted server, to determine that the first service trusted server is legitimate.

Step 746, the second service trusted server and the first service trusted server perform data interaction.

In an example embodiment, prior to Step S702 in which the challenge request sent by the first service trusted server is received, the trusted remote proving method provided by the application further includes the following:

Step 748, the platform metric policy request is sent to the trusted policy management server, where the platform metric policy request includes the certificate and the serial number of the second service trusted server, and respective component of the second service trusted server and corresponding metric policy identifier encrypted through the public key of the trusted policy management server.

Step 750, the platform metric policy response returned by the trusted policy management server is received, where the platform metric policy response includes the serial number of the second service trusted server, the certificate of the trusted policy management server, and the ciphertext encrypted through the public key of the second service trusted server.

Step 752, whether the certificate of the trusted policy management server is legitimate is verified.

Step 754, in the case where the verification result is YES, the ciphertext is decrypted through the private key of the second service trusted server, to obtain respective component of the second service trusted server, metric policy identifier corresponding to respective component, and the component metric algorithm.

Step 756, the metric policy identifier and the component metric algorithm in respective component are deployed.

In an example embodiment, corresponding to the second service trusted server side in the initialization phase in Embodiment 1, with reference to Step 748 to Step 756, details are as follows:

Step 758, the second service trusted server sends the platform metric policy request to the trusted policy management server.

The platform metric policy request includes the serial number of the second service trusted server $C_{SN}$, the certificate of the second service trusted server Cert_AIK$_C$, the second service trusted server respective component and the metric policy identifier corresponding to respective component encrypted through the public key of the trusted policy management server.

Here, if the second service trusted server component and the metric policy identifier corresponding to the component are unknown, the second service trusted server component and the metric policy identifier corresponding to the component may be obtained by querying the policy service center, or requesting the policy service center to newly create for the second service trusted server. In Step 758, it is assumed that the second service trusted server has obtained the second service trusted server respective component and the metric policy identifier corresponding to respective component.

Step 760, the second service trusted server receives the platform metric policy response sent by the trusted policy management server.

Step 762, the second service trusted server verifies whether the certificate of the trusted policy management server Cert_AIK$_S$ is legitimate. If the certificate is legitimate, Step 764 is performed. If the certificate is not legitimate, the process 700 is terminated at block 766.

Step 764, the second service trusted server, through the private key of the second service trusted server AIK$_{priv\_C}$, decrypts respective component and the metric policy identifier corresponding to respective component and the CMA corresponding to the policy identifier of the second service trusted server encrypted through the public key of the second service trusted server, to obtain respective component of the second service trusted server and the metric policy identifier corresponding to respective component and the CMA corresponding to the policy identifier of the second service trusted server.

Step 768, the second service trusted server writes the CMA to each group corresponding to the policy profile so as to prove that the remote certificate is a component that uses the CMA response.

Embodiment 3

Figure 8C:
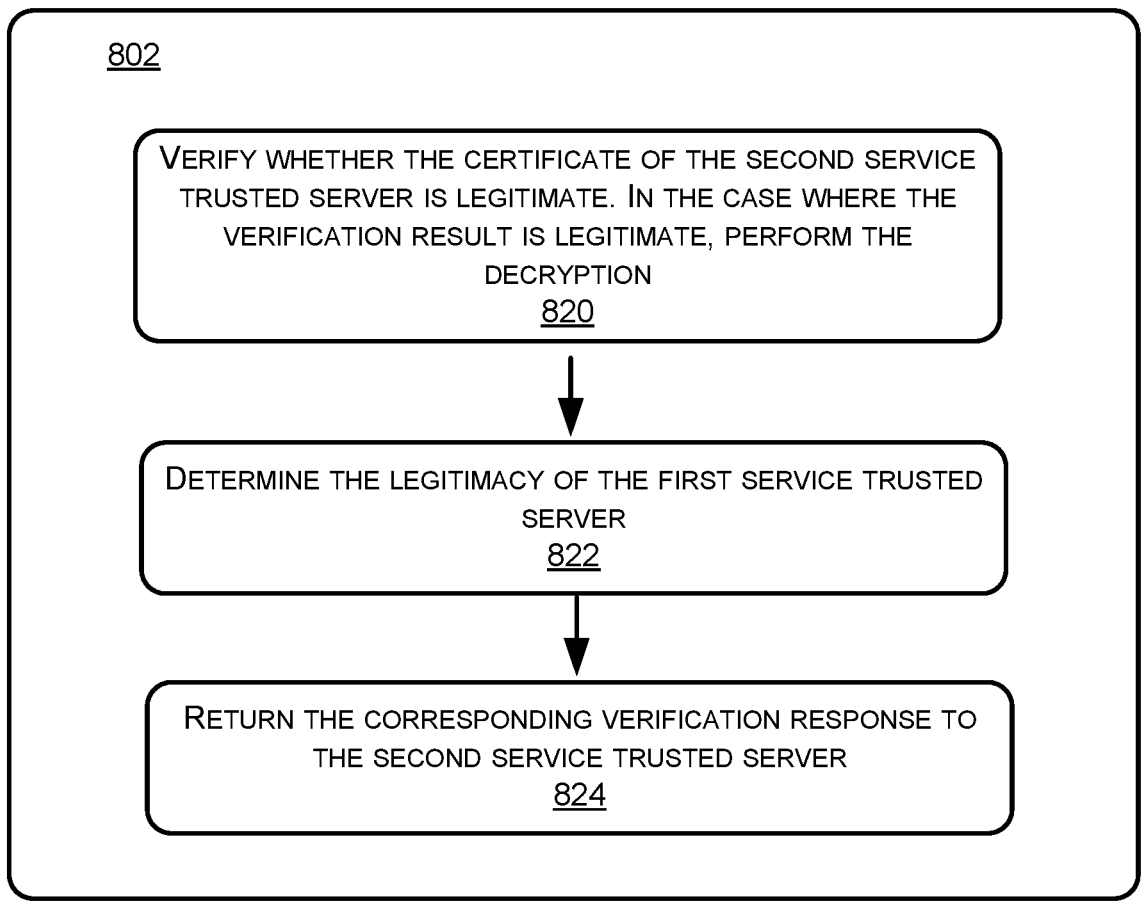
Figure 8D:
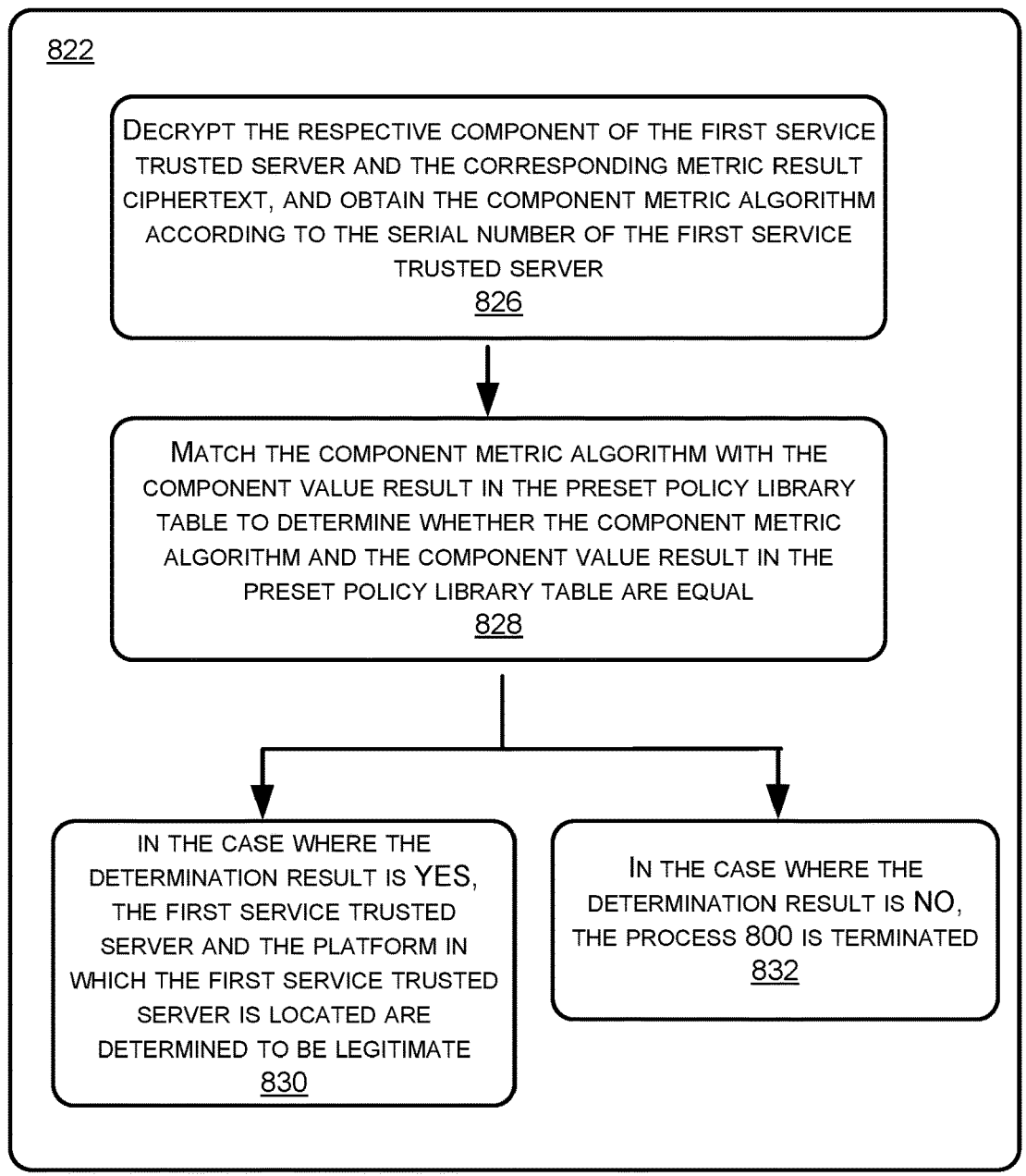
Figure 8E:
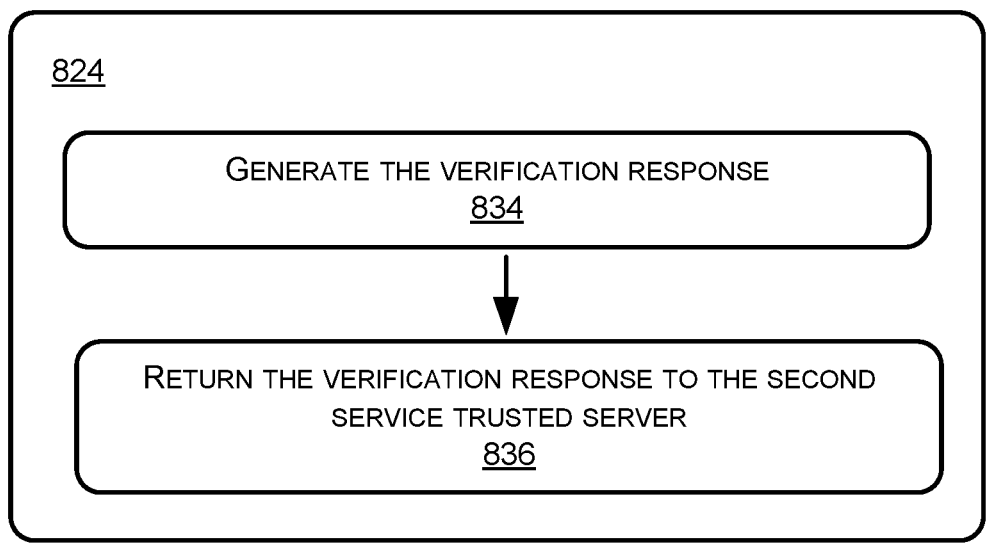
Figure 8F:
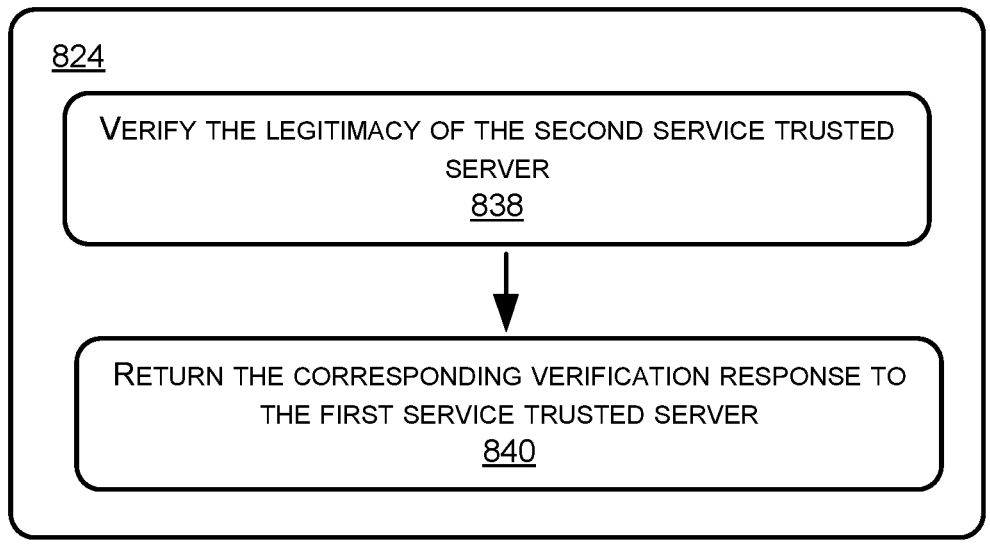

The application provides a trusted remote proving method as shown in FIGS. 8A-8F. On the trusted remote proving server side, FIG. 8A is a flowchart of the trusted remote proving method 800 according to Embodiment 3 of the present application.

Step 802, the verification request sent by the second service trusted server is received, where the verification request includes the to-be-verified information of the first service server. The second service trusted server interacts with the first service trusted server.

Step 804, the corresponding verification response is returned to the second service trusted server according to the verification request.

In an example embodiment, the trusted remote proving method provided by the present application, on the trusted remote proving server side, corresponds to the trusted remote proving server 106 in Embodiment 1. With reference to Steps 802 and 804, in the process of trusted remote proving, on the trusted remote proving server side, details are as follows:

Step 806, the trusted remote proving server receives the verification request.

Step 808, the trusted remote proving server verifies whether the certificate of the second service trusted server is legitimate. If the certificate is legitimate, Step 810 is performed. If the certificate is not legitimate, the process 800 is terminated at block 812.

Step 810, the trusted remote proving server, through the private key of the trusted remote proving server, decrypts respective component and the metric policy identifier corresponding to respective component encrypted through the platform identity public key AIK$_{pk\_v}$ of the trusted remote proving server. The trusted remote proving server, using the public key of the first service trusted server, decrypts the ciphertext of the component hash value, according to the serial number of the first service trusted server A$_{SN}$, to obtain {CMH1, CMH2, . . . , CMHn}.

Step 814, the trusted remote proving server queries the policy library according to respective component of the first service trusted server and the metric policy identifier corresponding to respective component. The trusted remote proving server compares the decrypted ciphertext of the component hash value with the component hash value in the policy library table, and determines whether the decrypted ciphertext of the component hash value and the component hash value in the policy library table are equal. If the decrypted ciphertext of the component hash value is equal to the component hash value in the policy library table, then it is determined that the first service trusted server is legitimate, and Step 816 is performed. If the decrypted ciphertext of the component hash value is not equal to the component hash value in the policy library table, the process 800 is terminated at block 818.

Step 816, the trusted remote proving server sends a verification response to the second service trusted server. The verification response includes the certificate of the trusted remote proving server, the random number n−2, and the legitimate message of the first service trusted server, which are encrypted through the second service trusted server public key.

In the example embodiments of the present application, the verification request sent by the second service trusted server is received. The verification request includes to-be-verified information of the first service server, where the second service trusted server interacts with the first service trusted server. The corresponding verification response is returned to the second service trusted server according to the verification request. The purpose of securing the privacy information of the service trusted server platform is achieved, thereby realizing the technical effect of improving the security of information transmission, thereby solving the influence of the policy deployment process on the operation of the server terminal and the transmission of the plaintext in the remote proving mechanism of the related technology. The technical problems caused by information security.

In the example embodiments of the present application, the verification request sent by the second service trusted server is received. The verification request includes the to-be-verified information of the first service server. The second service trusted server interacts with the first service trusted server. The corresponding verification response is returned to the second service trusted server according to the verification request. The purpose of securing the privacy information of the service trusted server platform is achieved, thereby realizing the technical effect of improving the security of information transmission. The technical problem of affecting the operation of the server terminal during the policy deployment and the information security issue caused by the plaintext transmission in the remote proving mechanism of the conventional techniques is solved.

In an example embodiment, Step 802, in which the corresponding verification response is returned to the second service trusted server according to the verification request includes the following:

Step 820, in the case where the verification request includes the certificate of the second service trusted server, the serial number of the second service trusted server, the serial number of the first service trusted server, the random number, and the ciphertext encrypted through the public key of the trusted remote proving server, whether the certificate of the second service trusted server is legitimate is verified. In the case where the verification result is legitimate, the decryption is performed using the private key of the trusted remote proving server, to obtain the serial number of the second service trusted server, the serial number of the first service trusted server, the random number, and the decrypted ciphertext, where the ciphertext includes respective component of the first service trusted server and corresponding metric policy identifier.

Step 822, the legitimacy of the first service trusted server is determined.

Step 824, the corresponding verification response is returned to the second service trusted server.

Furthermore, in an example embodiment, Step 822 in which the legitimacy of the first service trusted server is determined includes the following:

Step 826, the respective component of the first service trusted server and the corresponding metric result ciphertext is decrypted according to the public key of the first service trusted server, and the component metric algorithm according to the serial number of the first service trusted server is obtained.

Step 828, the component metric algorithm is matched with the component value result in the preset policy library table to determine whether the component metric algorithm and the component value result in the preset policy library table are equal.

Step 830, in the case where the determination result is YES, the first service trusted server and the platform in which the first service trusted server is located are determined to be legitimate.

Step 832, in the case where the determination result is NO, the process 800 is terminated.

In an example embodiment, Step 824 in which the corresponding verification response is returned to the second service trusted server includes the following:

Step 834, the verification response is generated according to the certificate of the trusted remote proving server and the verification response ciphertext encrypted through the public key of the second service trusted server. The verification response ciphertext includes the random number and the information which determines that the first service trusted server and the platform are legitimate.

Step 836, the verification response is returned to the second service trusted server.

In an example embodiment, Step 824 in which the corresponding verification response is returned to the second service trusted server includes the following:

Step 838, in the case where the verification request further includes respective component of the second service trusted server and corresponding metric policy identifier encrypted through the public key of the trusted remote proving server, the legitimacy of the second service trusted server is verified.

Step 840, the corresponding verification response is returned to the first service trusted server.

Embodiment 4

Figure 9B:
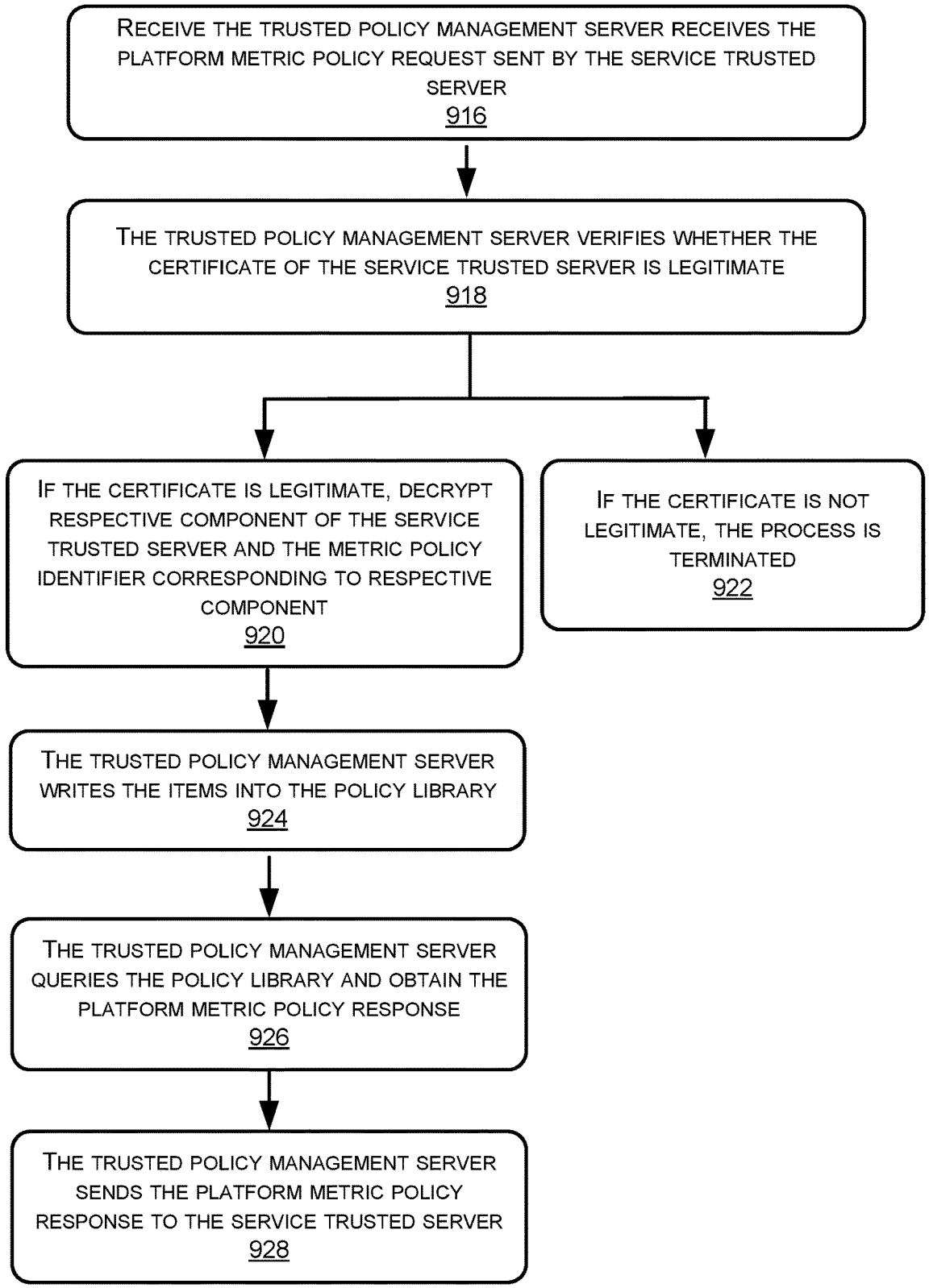

The application provides a trusted remote proving method as shown in FIGS. 9A and 9B. On the trusted policy management server side, FIG. 9A is a flowchart of the trusted remote proving method according to Embodiment 4 of the present application.

Step 902, the platform metric policy request is received, where the platform metric policy request includes the certificate and the serial number of the service trusted server, and respective component of the service trusted server and corresponding metric policy identifier encrypted through the public key of the trusted policy management server.

Step 904, whether the certificate of the service trusted server is legitimate is verified.

Step 906, in the case where the verification result is YES, the respective component of the service trusted server and corresponding metric policy identifier is decrypted through the private key of the trusted policy management server, to obtain the serial number of the service trusted server, respective component and the metric policy identifier corresponding to respective component.

Step 908, according to the corresponding component and the metric policy identifier corresponding to the component, the component metric algorithm corresponding to the metric policy identifier and the component hash value are obtained through querying the policy library.

Step 910, the respective component, the metric policy identifier corresponding to respective component, the component metric algorithm, and the component hash value are encrypted through the public key of the service trusted server, to obtain the platform metric policy ciphertext.

Step 912, the platform metric policy response is obtained according to the certificate of the trusted policy management server, the serial number of the service trusted server, and the platform metric policy ciphertext.

Step 914, the platform metric policy response is sent to the service trusted server.

In an example embodiment, the trusted remote proving method provided by the present application, on the trusted policy management server side, corresponds to the trusted policy management server in Embodiment 1. With reference to Steps 802 and 804, during the trusted remote proving, on the trusted policy management server side, details are as follows:

Step 916, the trusted policy management server receives the platform metric policy request sent by the service trusted server.

Step 918, the trusted policy management server verifies whether the certificate of the service trusted server is legitimate. If the certificate is legitimate, Step 920 is performed. If the certificate is not legitimate, the process 900 is terminated at block 922.

Step 920, the trusted policy management server, through the private key of trusted policy management server, decrypts respective component of the service trusted server and the metric policy identifier corresponding to respective component encrypted through the public key of the trusted policy management server.

Step 924, the trusted policy management server writes the following items into the policy library, i.e., respective component of the service trusted server and the metric policy identifier corresponding to respective component, the component metric algorithm (Component_Metri_Algorithm, CMA for short), the component hash value (Component_Metri_Hash, CMH for short), and the attribute description of a software or hardware component (Component_attribute, CA for short).

Step 926, the trusted policy management server queries the policy library according to respective component of the service trusted server and the metric policy identifier corresponding to respective component, to obtain CMA and CMH corresponding to the policy identifier of the service trusted server. The trusted policy management server encrypts respective component of the service trusted server and the metric policy identifier corresponding to respective component, CMA and CMH corresponding to the policy identifier of the service trusted server C, through the public key of the service trusted server, to obtain the platform metric policy response. The platform metric policy response further includes the serial number of the service trusted server $C_{SN}$ and the certificate of the trusted policy management server Cert_AIK$_S$.

Step 928, the trusted policy management server sends the platform metric policy response to the service trusted server.

In the example embodiments of the present application, the platform metric policy request is received. The platform metric policy request includes the certificate and the serial number the of the service trusted server, respective component of the service trusted server and corresponding metric policy identifier encrypted through the public key of the trusted policy management server. Whether the certificate of the service trusted server is legitimate is verified. In the case where the verification result is YES, respective component of the service trusted server and corresponding metric policy identifier is decrypted through the private key of the trusted policy management server, to obtain the serial number of the service trusted server, respective component and the metric policy identifier corresponding to respective component. According to respective component and the metric policy identifier corresponding to respective component, the policy library is queried to obtain the component metric algorithm and the component hash value corresponding to the metric policy identifier, Respective component, the metric policy identifier corresponding to respective component, the component metric algorithm, and the component hash value are encrypted through the public key of the service trusted server, to obtain the platform metric policy ciphertext. According to the certificate of the trusted policy management server, the serial number of the service trusted server and the platform metric policy ciphertext, the platform metric policy response is obtained. The platform metric policy response is sent to the service trusted server. The purpose of securing the privacy information of the service trusted server platform is achieved, thereby realizing the technical effect of improving the security of information transmission. The technical problem of affecting the operation of the server terminal during the policy deployment and the information security issue caused by the plaintext transmission in the remote proving mechanism of the conventional techniques is solved.

It should be noted that, regarding the above method embodiments, for the sake of simple description, these embodiments are expressed as a series of action combinations. However, a person of ordinary skill in the art should understand that the present application is not limited by the described action sequence. Some steps may be performed in other sequences or concurrently according to the present application. Also, a person of ordinary skill in the art may understand that the embodiments described in the specification are example embodiments, and some actions and modules involved may not be necessarily required by the present application.

Through the description of the above embodiments, a person of ordinary skill in the art may understand that the trusted remote proving method according to the above embodiment may be implemented by means of software plus a necessary general hardware platform, and of course, by hardware. However, in many cases, the former is a better implementation. Based on such understanding, the technical solution of the present application may be embodied in the form of a software product stored in a storage medium (such as a ROM/RAM, a disk, an optical disc) which includes a plurality of instructions causing a terminal device (which may be a mobile phone, a computer, a server, or a network device, etc.) to perform the method described in the various embodiments of the present application.

Embodiment 5

Figure 10:
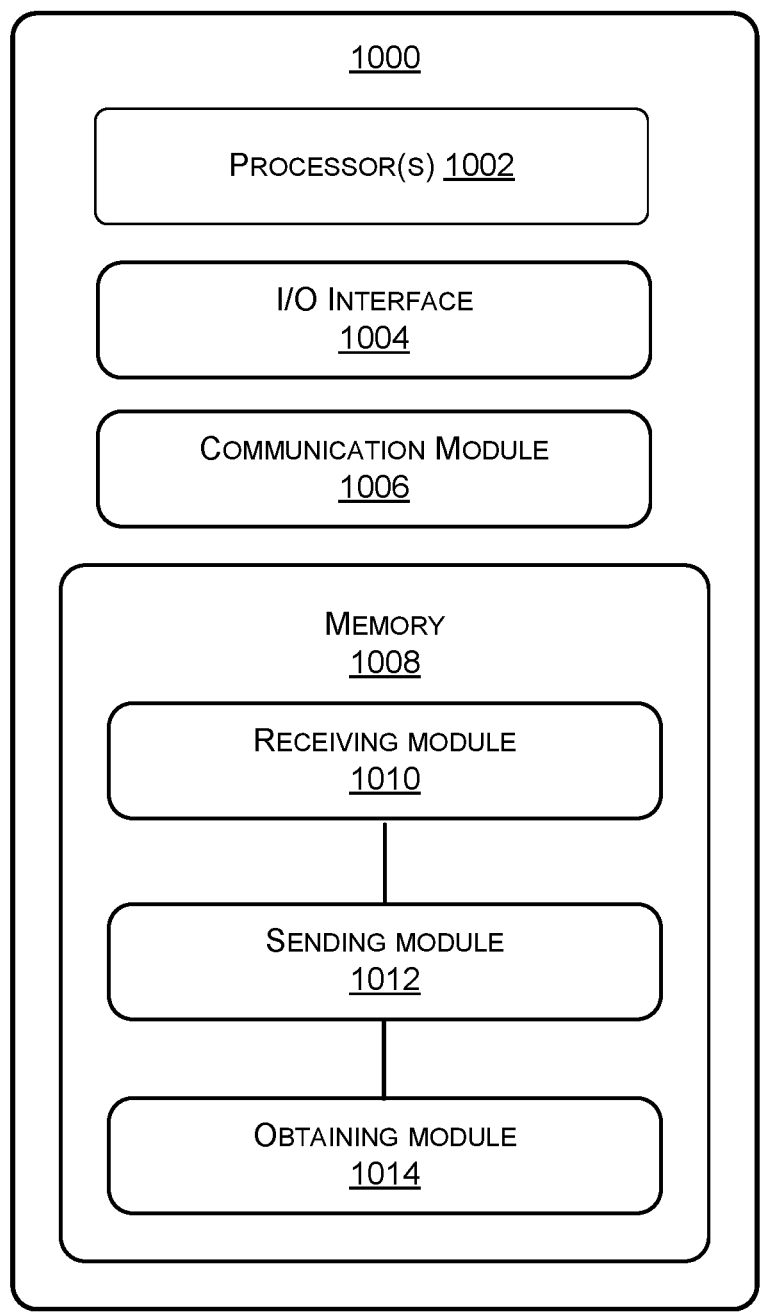
FIG. 10 is a flowchart of a trusted remote proving apparatus according to Embodiment 5 of the present application.

The application provides a trusted remote proving apparatus 1000 as shown in FIG. 10. On the side of the second service trusted server, FIG. 10 is a structural diagram of a trusted remote proving apparatus 1000 according to Embodiment 5 of the present application.

The application provides a trusted remote proving apparatus 1000 as shown in FIG. 10. On the second service trusted server side, FIG. 10 is a structural diagram of a trusted remote proving apparatus according to Embodiment 5 of the present application.

As shown in FIG. 10, the apparatus 1000 includes one or more processors 1002, an input/output module 1004, a communication module 1006, and a memory 1008. The input/output module 1004 is configured to receive data/signal to be processed and to output the processed data/signal. The communication module 1006 is configured to allow the apparatus 1000 to communicate with other devices (not shown) over a network (not shown). The memory 1008 stores thereon computer-executable modules executable by the one or more processors 1002, the computer-executable modules may include the following.

The receiving module 1010 is configured to receive a challenge request sent by the first service trusted server, and obtain the to-be-verified information of the first service trusted server in the challenge request.

The sending module 1012 is configured to send the verification request to the trusted remote proving server, where the verification request includes the to-be-verified information of the first service server.

The obtaining module 1014 is configured to obtain the verification response returned by the trusted remote proving server.

In the example embodiments of the present application, the challenge request sent by the first service trusted server is received. The to-be-verified information of the first service trusted server in the challenge request is obtained. The verification request is sent to the trusted remote proving server. The verification request includes the to-be-verified information of the first service server. The verification response returned by the trusted remote proving server is obtained. The purpose of securing the privacy information of the service trusted server platform is achieved, thereby realizing the technical effect of improving the security of information transmission. The technical problem of affecting the operation of the server terminal during the policy deployment and the information security issue caused by the plaintext transmission in the remote proving mechanism of the conventional techniques is solved.

It should be noted that the above receiving module 1010, the sending module 1012, and the obtaining module 1014 correspond to Steps 702 to 706 in the second embodiment. These three modules are the same as the examples and application scenarios implemented by the corresponding steps, but are not limited to the contents disclosed in the above Embodiment 2. It should be noted that the above modules may be implemented as part of the device in the trusted remote proving method provided in Embodiment 2, and may be implemented by software or by hardware.

In an example embodiment, the challenge request includes the certificate of the first service trusted server, the serial number of the first service trusted server and the first random number encrypted through the public key of the second service trusted server, and respective component of the first service trusted server and corresponding metric policy identifier encrypted through the public key of the trusted remote proving server.

Embodiment 6

Figure 11:
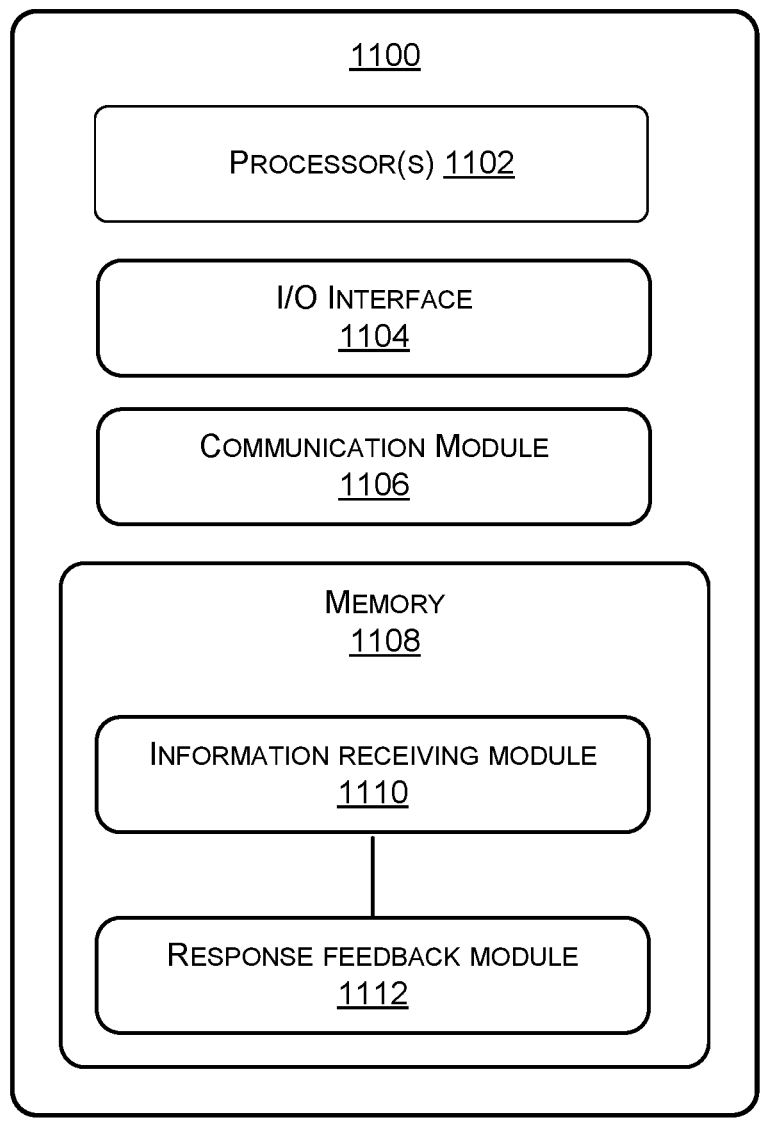
FIG. 11 is a flowchart of a trusted remote proving apparatus according to Embodiment 6 of the present application.

The application provides a trusted remote proving apparatus 1100 as shown in FIG. 11. On the trusted remote proving server side, FIG. 11 is a structural diagram of a trusted remote proving apparatus 1100 according to Embodiment 6 of the present application.

As shown in FIG. 11, the apparatus 1100 includes one or more processors 1102, an input/output module 1104, a communication module 1106, and a memory 1108. The input/output module 1104 is configured to receive data/signal to be processed and to output the processed data/signal. The communication module 1106 is configured to allow the apparatus 1100 to communicate with other devices (not shown) over a network (not shown). The memory 1108 stores thereon computer-executable modules executable by the one or more processors 1102, the computer-executable modules may include the following.

The information receiving module 1110 is configured to receive a verification request sent by the second service trusted server, where the verification request includes the to-be-verified information of the first service server. The second service trusted server interacts with the first service trusted server.

The response feedback module 1112 is configured to return the corresponding verification response to the second service trusted server according to the verification request.

In the example embodiments of the present application, the verification service sent by the second service trusted server is received, where the verification service includes the to-be-verified information of the first service server. The second service trusted server interacts with the first service trusted server. The corresponding verification response is returned to the second service trusted server according to verification request. The purpose of securing the privacy information of the service trusted server platform is achieved, thereby realizing the technical effect of improving the security of information transmission. The technical problem of affecting the operation of the server terminal during the policy deployment and the information security issue caused by the plaintext transmission in the remote proving mechanism of the conventional techniques is solved.

It should be noted that the above information receiving module 1110 and response feedback module 1112 correspond to Steps 802 and 804 in Embodiment 3. These two modules are identical to the examples and application scenarios implemented by the corresponding steps, but are not limited to the contents disclosed in the above Embodiment 3. It should be noted that the above modules may be implemented as part of the device in the trusted remote proving method provided in Embodiment 3, and may be implemented by software or hardware.

In an example embodiment, the response feedback module 1112 includes the following. The verification unit is configured to verify whether the certificate of the second service trusted server is legitimate in the case where the verification request includes the certificate of the second service trusted server, the serial number of the second service trusted server, the serial number of the first service trusted server, the random number, and the ciphertext, where the serial number of the second service trusted server, the serial number of the first service trusted server, the random number, and the ciphertext are encrypted through the public key of the trusted remote proving server. The decryption unit is configured to perform decryption through the private key of the trusted remote proving server in the case where the verification result is legitimate, to obtain the serial number of the second service trusted server, the serial number of the first service trusted server, the random number, and the decrypted ciphertext, where the ciphertext includes respective component of the first service trusted server and corresponding metric policy identifier. The determination unit is configured to determine the legitimacy of the first service trusted server. The response feedback unit is configured to return the corresponding verification response to the second service trusted server.

It should be noted that the above verification unit, the decryption unit, the determination unit, and the response feedback unit correspond to Steps 806, 808, 810, and 814 of Embodiment 3. These four units are the same as the examples and application scenarios implemented by the corresponding steps, but are not limited to the contents disclosed in the above Embodiment 3. It should be noted that the above modules may be implemented as part of the device in the trusted remote proving method provided in Embodiment 3, and may be implemented by software or hardware.

Embodiment 7

Figure 12:
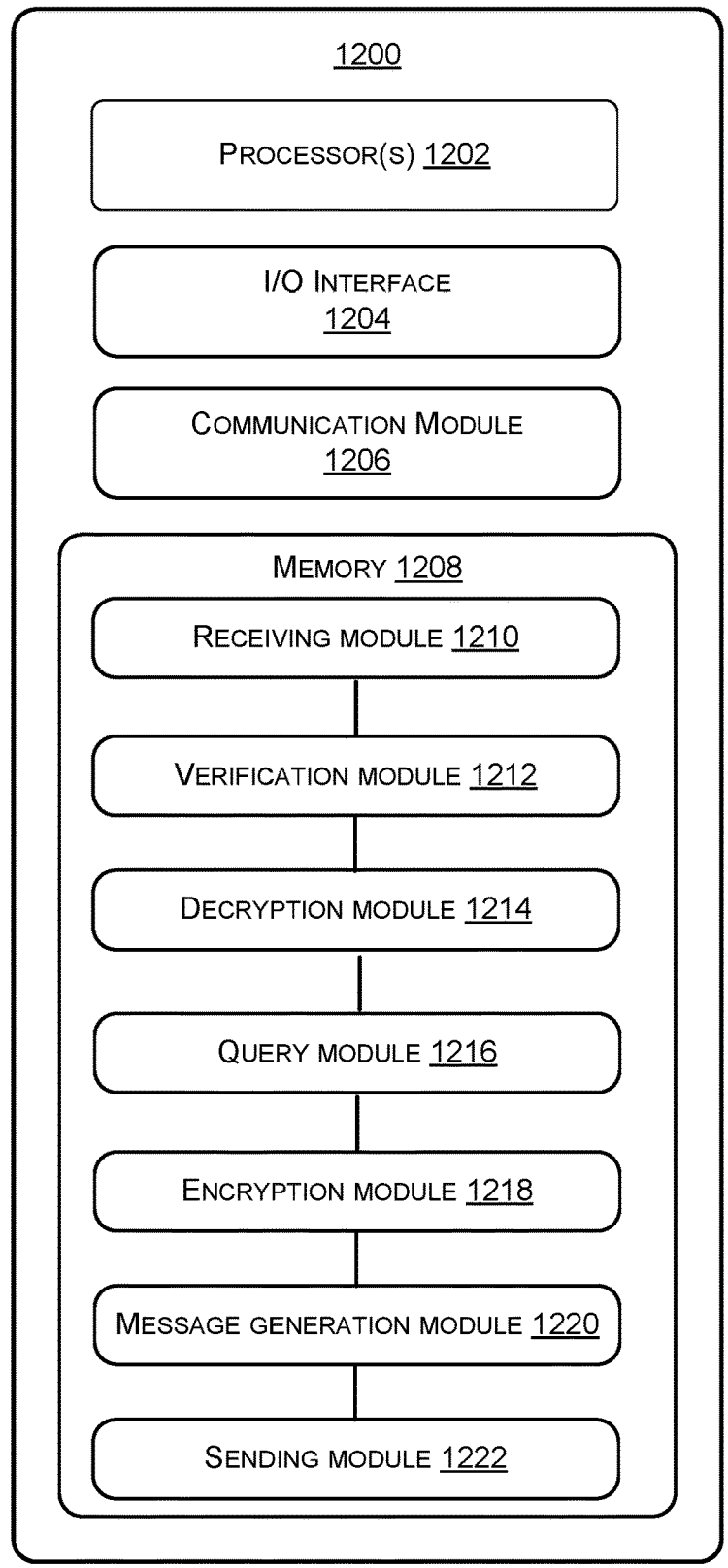
FIG. 12 is a flowchart of a trusted remote proving apparatus according to Embodiment 7 of the present application.

The application provides a trusted remote proving apparatus 1200 as shown in FIG. 12. On the trusted policy management server side, FIG. 12 is a structural diagram of a trusted remote proving apparatus 1200 according to Embodiment 7 of the present application.

As shown in FIG. 12, the apparatus 1200 includes one or more processors 1202, an input/output module 1204, a communication module 1206, and a memory 1208. The input/output module 1204 is configured to receive data/signal to be processed and to output the processed data/signal. The communication module 1206 is configured to allow the apparatus 1200 to communicate with other devices (not shown) over a network (not shown). The memory 1208 stores thereon computer-executable modules executable by the one or more processors 1202, the computer-executable modules may include the following.

The receiving module 1210 is configured to receive the request of obtaining the platform metric policy, where the request of obtaining the platform metric policy includes the certificate and the serial number the of the service trusted server, and respective component of the service trusted server and corresponding metric policy identifier encrypted through the public key of the trusted policy management server.

The verification module 1212 is configured to verify whether the certificate of the service trusted server is legitimate.

The decryption module 1214 is configured to decrypt respective component of the service trusted server and corresponding metric policy identifier through the private key of the trusted policy management server in the case where the verification result is YES, to obtain the serial number of the service trusted server, respective component and the metric policy identifier corresponding to respective component.

The query module 1216 is configured to, according to respective component and the metric policy identifier corresponding to respective component, query the policy library to obtain component metric algorithm and the component hash value corresponding to the metric policy identifier.

The encryption module 1218 is configured to encrypt respective component, metric policy identifier corresponding to respective component, component metric algorithm and the component hash value through the public key of the service trusted server, to obtain the platform metric policy ciphertext.

The message generation module 1220 is configured to obtain the platform metric policy response according to the certificate of the trusted policy management server, the serial number of the service trusted server and the platform metric policy ciphertext.

The sending module 1222 is configured to send the platform metric policy response to the service trusted server.

In the example embodiments of the present application, the platform metric policy request is received, where the platform metric policy request includes the certificate and the serial number the of the service trusted server, and respective component of the service trusted server and corresponding metric policy identifier encrypted through the public key of the trusted policy management server. Whether the certificate of the service trusted server is legitimate is verified. In the case where the verification result is YES, respective component of the service trusted server and corresponding metric policy identifier are decrypted through the private key of the trusted policy management server, to obtain the serial number of the service trusted server, respective component and the metric policy identifier corresponding to respective component. According to respective component and the metric policy identifier corresponding to respective component, the policy library is queried to obtain the component metric algorithm and the component hash value corresponding to the metric policy identifier. Respective component, metric policy identifier corresponding to respective component, component metric algorithm, and the component hash value are encrypted through the public key of the service trusted server, to obtain the platform metric policy ciphertext. According to the certificate of the trusted policy management server, the serial number of the service trusted server, and the platform metric policy ciphertext, the platform metric policy response is obtained. The platform metric policy response is sent to the service trusted server. The purpose of securing the privacy information of the service trusted server platform is achieved, thereby realizing the technical effect of improving the security of information transmission. The technical problem of affecting the operation of the server terminal during the policy deployment and the information security issue caused by the plaintext transmission in the remote proving mechanism of the conventional techniques is solved.

It should be noted that the above the receiving module 1210 to the sending module 1222 correspond to Steps 902 to 914 in the Embodiment 4. These seven modules are the same as the examples and application scenarios implemented by the corresponding steps, but are not limited to the content disclosed in the above Embodiment 4. It should be noted that the above modules may be operated as part of the device in the trusted remote proving method provided by Embodiment 4, and may be implemented by software or hardware.

Embodiment 8

According to an aspect of another embodiment of the present application, a trusted remote proving method is provided, including the following. to-be-verified information is encrypted through the public key of the trusted remote proving server, to obtain the encrypted to-be-verified information. The second service trusted server forwards the encrypted to-be-verified information to the trusted remote proving server.

Embodiment 9

According to an aspect of another embodiment of the present application, another trusted remote proving method is provided, including the following. The platform metric policy request is received, where the platform metric policy request includes respective component of the service trusted server and corresponding metric policy identifier encrypted through the public key of the trusted policy management server. According to respective component of the service trusted server and corresponding metric policy identifier, the platform metric policy response is generated. The platform metric policy response is sent to the service trusted server.

Embodiment 10

According to an aspect of another embodiment of the present application, a trusted remote proving method is provided, including the following. The platform metric policy response sent by the trusted policy management server is received. The metric policy of the metric algorithm in the platform metric policy response corresponding to each component is deployed in the policy configuration file.

Embodiment 11

An embodiment of the present application also provides a storage medium. In an example embodiment, the above storage medium may be used to save the program code executed by the trusted remote proving method provided in Embodiment 1.

In an example embodiment, the above storage medium may be located in any one server terminal of a server terminal group in a computer network, or in any one mobile terminal of a mobile terminal group.

In an example embodiment, the storage medium is configured to store program code for performing the following steps. The challenge request sent by the first service trusted server is received. The to-be-verified information of the first service trusted server in the challenge request is obtained. The verification request is sent to the trusted remote proving server, where verification request includes the to-be-verified information of the first service server. The verification response returned by the trusted remote proving server is obtained.

In an example embodiment, the storage medium is configured to store program code for performing the following steps. The challenge request includes the certificate of the first service trusted server, the serial number of the first service trusted server, and the first random number encrypted through the public key of the second service trusted server, and respective component of the first service trusted server and corresponding metric policy identifier encrypted through the public key of the trusted remote proving server.

Furthermore, in an example embodiment, the storage medium is configured to store program code for performing the following steps. Obtaining the to-be-verified information of the first service trusted server in the challenge request includes verifying whether the certificate of the first service trusted server is legitimate. In the case where the verification result is legitimate, the ciphertext in the challenge request is decrypted through the private key of the second service trusted server, to obtain the to-be-verified information, where the to-be-verified information includes the serial number of the first service trusted server and the random number. In the case where the verification result is not legitimate, the operation is terminated.

In an example embodiment, the storage medium is configured to store program code for performing the following steps. Sending the verification request to the trusted remote proving server includes generating the verification request according to the certificate of the second service trusted server, the serial number of the second service trusted server, the second random number, the serial number of the first service trusted server, respective component of the first service trusted server and corresponding metric policy identifier encrypted through the public key of the trusted remote proving server, in the case where the to-be-verified information also includes respective component of the first service trusted server and corresponding metric policy identifier encrypted through the public key of the trusted remote proving server. The verification request is sent to the trusted remote proving server.

Furthermore, in an example embodiment, the storage medium is configured to store program code for performing the following steps. Sending the verification request to the trusted remote proving server includes generating the verification request according to the certificate of the second service trusted server, the serial number of the second service trusted server, the second random number, the serial number of the first service trusted server, respective component of the first service trusted server and corresponding metric policy identifier encrypted through the public key of the trusted remote proving server, respective component of the second service trusted server and corresponding metric policy identifier encrypted through the public key of the trusted remote proving server, in the case where the to-be-verified information also includes respective component of the second service trusted server and corresponding metric policy identifier encrypted through the public key of the trusted remote proving server. The verification request is sent to the trusted remote proving server.

In an example embodiment, the storage medium is configured to store program code for performing the following steps. Obtaining the verification response returned by the trusted remote proving server includes verifying whether the certificate of the trusted remote proving server in the verification response is legitimate, in the case where the ciphertext in the verification response is encrypted through the public key of the second service trusted server. In the case where the verification result is legitimate, the ciphertext is decrypted through the private key of the second service trusted server, to obtain the identity of the first service trusted server and the legitimacy of the platform in which the first service trusted server is located. In the case where the verification result is not legitimate, the operation is terminated.

In an example embodiment, the storage medium is configured to store program code for performing the following steps. Prior to receiving the challenge request sent by the first service trusted server, the method further includes the following. The platform metric policy request is sent to the trusted policy management server, where the platform metric policy request includes the certificate of the second service trusted server and serial number, respective component of the second service trusted server and corresponding metric policy identifier encrypted through the public key of the trusted policy management server. The platform metric policy response returned by the trusted policy management server is received, where the platform metric policy response includes the serial number of the second service trusted server, the certificate of the trusted policy management server and the ciphertext encrypted through the public key of the second service trusted server. Whether the certificate of the trusted policy management server in the platform metric policy response is legitimate is verified. In the case where the verification result is YES, the ciphertext is decrypted through the private key of the second service trusted server, to obtain respective component of the second service trusted server, the metric policy identifier corresponding to respective component and component metric algorithm. The metric policy identifier and the component metric algorithm are deployed in respective component.

The serial numbers of the above embodiments of the present disclosure are merely for the purpose of description, and do not represent the advantages and disadvantages of the embodiments.

In the above embodiments of the disclosure, the description of each embodiment has its own emphasis. For a part that is not detailed in a certain embodiment, reference may be made to related descriptions of other embodiments.

In the several embodiments provided by the present application, it should be understood that the disclosed technical contents may be implemented in other manners. The device embodiments described above are merely illustrative. For example, the division of units is only a logical function division. In practice, the actual implementation may have other division manners. For example, multiple units or components may be combined or integrated into another system. Also, some features may be omitted or not implemented. Alternatively, mutual coupling, direct coupling, or communication connection shown or discussed may be through some interfaces. The indirect coupling or communication connection between units or modules may be in electrical or other forms.

The units described as separate components may or may not be physically separate. The components displayed as units may or may not be physical units, that is, may be located in one place, or may be distributed amount multiple network units. Some or all of the units may be selected according to actual needs to achieve the purpose of the solution of the embodiments.

In addition, in the present disclosure, each functional unit in each embodiment may be integrated into one processing unit. Alternatively, each unit may exist physically separately. Alternatively, two or more units may be integrated into one unit. The above integrated units may be implemented either in hardware or in the form of software functional units.

If the integrated unit is implemented in the form of a software functional unit and sold or used as a standalone product, it can be stored in a computer-readable storage medium. Based on such understanding, the technical solution of the present disclosure, or part of the technical solution may be embodied in the form of a software product. The computer software product is stored in a storage medium, which includes a plurality of instructions that cause a computer device (which may be a personal computer, a server, a network device, etc.) to perform all or some of the steps of methods of various embodiments of the present disclosure. The above storage medium includes various media that may store program codes such as a U disk, a Read-Only Memory (ROM), a Random Access Memory (RAM), a mobile hard drive, a magnetic disk, an optical disk, and the like. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The above descriptions are example embodiments of the disclosure. It should be noted that several modifications and refinements may be made by a person of ordinary skill in the art without departing from the disclosure. Such modifications and refinements are also considered as falling within the scope of the application.

EXAMPLE CLAUSES

1. A trusted remote proving method, comprising: receiving a challenge request sent by a first service trusted server, and obtaining to-be-verified information of the first service trusted server in the challenge request; and sending a verification request to a trusted remote proving server, wherein the verification request includes the to-be-verified information of the first service trusted server; obtaining a verification response returned by the trusted remote proving server.

Clause 2. The trusted remote proving method according to clause 1, wherein the challenge request comprises: a certificate of the first service trusted server, a serial number and a first random number of the first service trusted server encrypted through a public key of a second service trusted server, and respective component of the first service trusted server and corresponding metric policy identifier encrypted through a public key of the trusted remote proving server.

Clause 3. The trusted remote proving method according to clause 2, wherein obtaining the to-be-verified information of the first service trusted server in the challenge request comprises: verifying that the certificate of the first service trusted server is legitimate; in the case where the result of the verification is legitimate, decrypting a ciphertext in the challenge request through a private key of the second service trusted server to obtain the to-be-verified information, wherein the to-be-verified information includes a serial number and a random number of the first service trusted server; and in the case where the result of the verification is illegitimate, terminating operation.

Clause 4. The trusted remote proving method according to clause 2 or 3, wherein sending the verification request to the trusted remote proving server comprises: in the case where the to-be-verified information further includes respective component of the first service trusted server and corresponding metric policy identifier encrypted through the public key of the trusted remote proving server, according to a certificate of the second service trusted the server, a sequence number of the second service trusted server, a second random number, the sequence number of the first service trusted server, and respective component of the first service trusted server and corresponding metric policy identifier encrypted through the public key of the trusted remote proving server, generating the verification request; and sending the verification request to the trusted remote proving server.

Clause 5. The trusted remote proving method according to clause 4, wherein sending the verification request to the trusted remote proving server comprises: in the case where the to-be-verified information further includes respective component of the second service trusted server and corresponding metric policy identifier encrypted through the public key of the trusted remote proving server, according to a certificate of the second service trusted the server, the sequence number of the second service trusted server, the second random number, the sequence number of the first service trusted server, respective component of the first service trusted server and corresponding metric policy identifier encrypted through the public key of the trusted remote proving server, and respective component of the second service trusted server and the corresponding metric policy identifier encrypted through the public key of the trusted remote proving server, generating the verification request; and sending the verification request to the trusted remote proving server.

Clause 6. The trusted remote proving method according to clause 1, wherein obtaining the verification response returned by the trusted remote proving server comprises: in the case where a ciphertext in the verification response is a public key of a second service trusted server, verifying whether a certificate of the trusted remote proving server in the verification response is legitimate; in the case where the result of the verification is legitimate, decrypting the ciphertext through a private key of the second service trusted server to obtain an identity of the first service trusted server and legitimacy of a platform in which the first service trusted server is located; and in the case where the result of the verification is illegitimate, terminating operation.

Clause 7. The trusted remote proving method according to clause 1, wherein before receiving the challenge request sent by the first service trusted server, the method further comprises: sending a platform metric policy request to a trusted policy management server; wherein the platform metric policy request includes: a certificate and a serial number of a second service trusted server, and respective component of the second service trusted server and corresponding metric policy identifier encrypted through a public key of the trusted policy management server; receiving a platform metric policy response returned by the trusted policy management server, wherein the platform metric policy response includes: a sequence number of the second service trusted server, a certificate of the trusted policy management server, and a ciphertext encrypted through a public key of the second service trusted server; verifying whether the certificate of the trusted policy management server in the platform metric policy response is legitimate; in the case where the result of the verification is yes, decrypting the ciphertext through a private key of the second service trusted server to obtain the respective component of the second service trusted server, the metric policy identifier corresponding to the respective component, and a component metric algorithm; and deploying the metric policy identifier and the component metric algorithm in the respective component.

Clause 8. A trusted remote proving method, comprising: receiving a verification request sent by a second service trusted server, wherein the verification request includes: to-be-verified information of a first service trusted server, and the second service trusted server interacts with the first service trusted server; and returning a corresponding verification response to the second service trusted server according to the verification request.

Clause 9. The trusted remote proving method according to clause 8, wherein returning the corresponding verification response to the second service trusted server according to the verification request comprises: in the case where the verification request includes a certificate of the second service trusted server, and a serial number of the second service trusted server, a serial number of the first service trusted server, a random number, and a ciphertext encrypted through a public key of the trusted remote proving server, verifying whether the certificate of the second service trusted server is legitimate; in the case where the result of the verification is legitimate, decrypting by using a private key of the trusted remote proving server to obtain the serial number of the second service trusted server, the serial number of the first service trusted server, the random number, and the decrypted ciphertext, wherein the ciphertext includes: respective component of the first service trusted server and a corresponding metric policy identifier; determining legitimacy of the first service trusted server; and returning the corresponding verification response to the second service trusted server.

Clause 10. The trusted remote proving method according to clause 9, wherein determining the legitimacy of the first service trusted server comprises: decrypting the respective component of the first service trusted server and corresponding metric result ciphertext according to a public key of the first service trusted server, and obtaining a component metric algorithm according to the serial number of the first service trusted server; matching the component metric algorithm with a component value result in a preset policy library table to determine whether they are equal; in the case where the result of the determination is yes, determining that the first service trusted server and a platform in which the first service trusted server is located are legitimate; and in the case where the result of the determination is negative, terminating operation.

Clause 11. The trusted remote proving method according to clause 9, wherein returning the corresponding verification response to the second service trusted server comprises: generating the verification response according to the certificate of the trusted remote proving server, and a verification response ciphertext encrypted through a public key of the second service trusted server, wherein the verification response ciphertext includes: a random number and information of determining that the first service trusted server and a platform in which the first service trusted server is located are legitimate; and returning the verification response to the second service trusted server.

Clause 12. The trusted remote proving method according to clause 9, wherein returning the corresponding verification response to the second service trusted server comprises: in the case where the verification request further includes respective component of the second service trusted server and corresponding metric policy identifier encrypted through a public key of the trusted remote proving server, verifying the legitimacy of the second service trusted server; and returning a corresponding verification response to the first service trusted server.

Clause 13. A trusted remote proving method, comprising: receiving a platform metric policy request; wherein the platform metric policy request includes: a certificate and a serial number of a service trusted server, and respective component of the service trusted server and corresponding metric policy identifier encrypted through a public key of the trusted policy management server; verifying whether the certificate of the service trusted server is legitimate; in the case where the result of the verification is yes, decrypting the respective component of the service trusted server and the corresponding metric policy identifier through a private key of the trusted policy management server to obtain the serial number and the respective component of the service trusted server and the metric policy identifier corresponding to the respective component; according to the respective component and the metric policy identifier corresponding to the respective component, obtaining a component metric algorithm and a component metric hash value corresponding to the metric policy identifier by querying a policy library; encrypting the respective component, the metric policy identifier corresponding to the respective component, the component metric algorithm, and the component metric hash value by a public key of the service trusted server to obtain a platform metric policy ciphertext; obtaining a platform metric policy response according to a certificate of the trusted policy management server, the serial number of the service trusted server, and the platform metric policy ciphertext; and sending the platform metric policy response to the service trusted server.

Clause 14. A trusted remote proving apparatus, comprising: a receiving module configured to receive a challenge request sent by a first service trusted server, and obtain to-be-verified information of the first service trusted server in the challenge request; a sending module configured to send a verification request to a trusted remote proving server, wherein the verification request includes the to-be-verified information of the first service trusted server; and an obtaining module configured to obtain a verification response returned by the trusted remote proving server.

Clause 15. The trusted remote proving apparatus according to clause 14, wherein the challenge request comprises: a certificate of the first service trusted server, a serial number and a first random number of the first service trusted server encrypted through a public key of a second service trusted server, and respective component of the first service trusted server and corresponding metric policy identifier encrypted through a public key of the trusted remote proving server.

Clause 16. A trusted remote proving apparatus, comprising: an information receiving module configured to receive a verification request sent by a second service trusted server, wherein the verification request includes: to-be-verified information of a first service trusted server, and the second service trusted server interacts with the first service trusted server; and a response feedback module configured to return a corresponding verification response to the second service trusted server according to the verification request.

Clause 17. The trusted remote proving apparatus according to clause 16, wherein the response feedback module comprises: a verification unit configured to verify whether a certificate of the second service trusted server is legitimate in the case where the verification request includes the certificate of the second service trusted server, and a serial number of the second service trusted server, a serial number of the first service trusted server, a random number, and a ciphertext encrypted through a public key of the trusted remote proving server; a decryption unit configured to decrypt by using a private key of the trusted remote proving server in the case where the result of the verification is legitimate, to obtain the serial number of the second service trusted server, the serial number of the first service trusted server, the random number, and the decrypted ciphertext, wherein the ciphertext includes: respective component of the first service trusted server and a corresponding metric policy identifier; a determining unit configured to determine legitimacy of the first service trusted server; and a response feedback unit configured to return a corresponding verification response to the second service trusted server.

Clause 18. A trusted remote proving apparatus, comprising: a receiving module configured to receive a platform metric policy request; wherein the platform metric policy request includes: a certificate and a serial number of a service trusted server, and respective component of the service trusted server and corresponding metric policy identifier encrypted through a public key of the trusted policy management server; a verification module configured to verify whether the certificate of the service trusted server is legitimate; a decryption module configured to decrypt the respective component of the service trusted server and the corresponding metric policy identifier through a private key of the trusted policy management server in the case where the result of the verification is yes, to obtain the serial number and the respective component of the service trusted server and the metric policy identifier corresponding to the respective component; a query module configured to obtain a component metric algorithm and a component metric hash value corresponding to the metric policy identifier by querying a policy library according to the respective component and the metric policy identifier corresponding to the respective component; an encryption module configured to encrypt the respective component, the metric policy identifier corresponding to the respective component, the component metric algorithm, and the component metric hash value by a public key of the service trusted server to obtain a platform metric policy ciphertext; a message generating module configured to obtain a platform metric policy response according to a certificate of the trusted policy management server, the serial number of the service trusted server, and the platform metric policy ciphertext; and a sending module configured to send the platform metric policy response to the service trusted server.

Clause 19. A trusted remote proving system, comprising: a first service trusted server, a second service trusted server, and a trusted remote proving server, wherein
the second service trusted server is configured to receive a challenge request sent by a first service trusted server, and obtain to-be-verified information of the first service trusted server in the challenge request, and send a verification request to a trusted remote proving server, wherein the verification request includes the to-be-verified information of the first service trusted server, and obtain a verification response returned by the trusted remote proving server; and the trusted remote proving server is configured to receive a verification request sent by a second service trusted server and return a corresponding verification response to the second service trusted server according to the verification request, wherein the verification request includes: to-be-verified information of a first service trusted server, and the second service trusted server interacts with the first service trusted server.

Clause 20. The trusted remote proving system according to clause 19, wherein the trusted remote proving system further comprises: a trusted policy management server, wherein before the second service trusted server receives the challenge request sent by the first service trusted server, the trusted policy management server receives a platform metric policy request sent by each of the first service trusted server and the second service trusted server, and return a corresponding platform metric policy response according to the platform metric policy request, so that the first service trusted server and the second service trusted server perform policy configuration according to the platform metric policy response.

Clause 21. A trusted remote proving method, comprising: encrypting to-be-verified information by a public key of a trusted remote proving server, to obtain the encrypted to-be-verified information; and forwarding the encrypted to-be-verified information to the trusted remote proving server by a second service trusted server.

Clause 22. A trusted remote proving method, comprising: receiving a platform metric policy request sent by a service trusted server; wherein the platform metric policy request includes: respective component of the service trusted server and corresponding metric policy identifier encrypted through a public key of a trusted policy management server; generating a platform metric policy response according to the respective component of the service trusted server and the corresponding metric policy identifier; and sending the platform metric policy response to the service trusted server.

Clause 23. A trusted remote proving method, comprising: receiving a platform metric policy response sent by a trusted policy management server; and configuring a metric algorithm in the platform metric policy response and a metric policy corresponding to each component in a policy configuration file.

What is claimed is:
1. A method, performed by a second service trusted server, comprising:
receiving a challenge request sent by a first service trusted server, the challenge request comprising:
a certificate of the first service trusted server, and
a serial number and a first random number of the first service trusted
server encrypted through a public key of the second service trusted server;
obtaining to-be-verified information of the first service trusted server in the challenge request;
in response to determining that the to-be-verified information of the first service trusted server further includes a respective component of the second service trusted server and a corresponding metric policy identifier of the respective component of the second service trusted server encrypted through a public key of a trusted remote proving server, generating a verification request according to a certificate of the second service trusted server, a serial number of the second service trusted server, a second random number, the serial number of the first service trusted server, a respective component of the first service trusted server and a corresponding metric policy identifier of the respective component of the first service trusted server encrypted through the public key of the trusted remote proving server, the respective component of the second service trusted server, and the corresponding metric policy identifier of the respective component of the second service trusted server encrypted through the public key of the trusted remote proving server;

sending the verification request to the trusted remote proving server, the verification request including the to-be-verified information of the first service trusted server; and obtaining a verification response returned by the trusted remote proving server in response to the verification request.

2. The method according to claim 1, wherein the challenge request further comprises the respective component of the first service trusted server and the corresponding metric policy identifier of the first service trusted server encrypted through the public key of the trusted remote proving server.

3. The method according to claim 2, wherein the obtaining the to-be-verified information of the first service trusted server in the challenge request comprises:

determining whether the certificate of the first service trusted server is legitimate; upon determining that the certificate is legitimate, decrypting a ciphertext in the challenge request through a private key of the second service trusted server to obtain the to-be-verified information, the to-be-verified information including the serial number and the first random number of the first service trusted server; and upon determining that the certificate is not legitimate, terminating operation.

4. The method according to claim 2, wherein the sending the verification request to the trusted remote proving server comprises:

in response to determining that the to-be-verified information further includes the respective component of the first service trusted server and the corresponding metric policy identifier of the respective component of the first service trusted server encrypted through the public key of the trusted remote proving server, generating the verification request according to the certificate of the second service trusted server, the serial number of the second service trusted server, the second random number, the serial number of the first service trusted server, and the respective component of the first service trusted server and the corresponding metric policy identifier of the respective component of the first service trusted server encrypted through the public key of the trusted remote proving server; and sending the verification request to the trusted remote proving server.

5. The method according to claim 1, wherein the obtaining the verification response returned by the trusted remote proving server comprises:

upon determining that a ciphertext in the verification response is the public key of the second service trusted server, verifying whether a certificate of the trusted remote proving server in the verification response is legitimate;

upon determining that the certificate of the trusted remote proving server is legitimate, decrypting the ciphertext through a private key of the second service trusted server to obtain an identity of the first service trusted server and legitimacy of a platform in which the first service trusted server is located; and upon determining that the certificate of the trusted remote proving server is not legitimate, terminating operation.

6. The method according to claim 1, wherein before the receiving the challenge request sent by the first service trusted server, the method further comprises:

sending a platform metric policy request to a trusted policy management server, the platform metric policy request including:

the certificate and the serial number of the second service trusted server, and the respective component of the second service trusted server and the corresponding metric policy identifier of the respective component of the second service trusted server encrypted through a public key of the trusted policy management server;

receiving a platform metric policy response returned by the trusted policy management server, the platform metric policy response including:

the serial number of the second service trusted server, a certificate of the trusted policy management server, and a ciphertext encrypted through the public key of the second service trusted server;

determining whether the certificate of the trusted policy management server in the platform metric policy response is legitimate;

upon determining that that the certificate of the trusted policy management server is legitimate, decrypting the ciphertext through a private key of the second service trusted server to obtain the respective component of the second service trusted server, the corresponding metric policy identifier of the respective component of the second service trusted server, and a component metric algorithm; and deploying the corresponding metric policy identifier of the respective component of the second service trusted server and the component metric algorithm in the respective component of the second service trusted server.

7. The method according to claim 6, further comprising:

upon determining that that the certificate of the trusted policy management server is not legitimate, terminating operation.

8. One or more computer-readable media, stored thereon instructions that, when executed by one or more processors, cause the one or more processors to perform acts including:

receiving a challenge request sent by a first service trusted server, the challenge request comprising:

a certificate of the first service trusted server, and a serial number and a first random number of the first service trusted server encrypted through a public key of a second service trusted server;

obtaining to-be-verified information of the first service trusted server in the challenge request;

in response to determining that the to-be-verified information of the first service trusted server further includes a respective component of the second service trusted server and a corresponding metric policy identifier of the respective component of the second service trusted server encrypted through a public key of a trusted remote proving server, generating a verification request according to a certificate of the second service trusted server, a serial number of the second service trusted server, a second random number, the serial number of the first service trusted server, a respective component of the first service trusted server and a corresponding metric policy identifier of the respective component of the first service trusted server encrypted through the public key of the trusted remote proving server;

sending the verification request to the trusted remote proving server, the verification request including the to-be-verified information of the first service trusted server; and obtaining a verification response returned by the trusted remote proving server.

9. The one or more computer-readable media according to claim 8, wherein the challenge request further comprises the respective component of the first service trusted server and the corresponding metric policy identifier of the first service trusted server encrypted through the public key of the trusted remote proving server.

10. The one or more computer-readable media according to claim 9, wherein the obtaining the to-be-verified information of the first service trusted server in the challenge request comprises:
   determining whether the certificate of the first service trusted server is legitimate; upon determining that the certificate is legitimate, decrypting a ciphertext in the challenge request through a private key of the second service trusted server to obtain the to-be-verified information, the to-be-verified information including the serial number and the first random number of the first service trusted server; and
   upon determining that the certificate is not legitimate, terminating operation.

11. The one or more computer-readable media according to claim 9, wherein the sending the verification request to the trusted remote proving server comprises:
   in response to determining that the to-be-verified information further includes respective component of the first service trusted server and corresponding metric policy identifier of the respective component of the first service trusted server encrypted through the public key of the trusted remote proving server, generating the verification request according to the certificate of the second service trusted server, the serial number of the second service trusted server, the second random number, the serial number of the first service trusted server, and the respective component of the first service trusted server and the corresponding metric policy identifier of the respective component of the first service trusted server encrypted through the public key of the trusted remote proving server; and
   sending the verification request to the trusted remote proving server.

12. The one or more computer-readable media according to claim 8, wherein obtaining the verification response returned by the trusted remote proving server comprises:
   upon determining that a ciphertext in the verification response is the public key of the second service trusted server, verifying whether a certificate of the trusted remote proving server in the verification response is legitimate;
   upon determining that the certificate of the trusted remote proving server is legitimate, decrypting the ciphertext through a private key of the second service trusted server to obtain an identity of the first service trusted server and legitimacy of a platform in which the first service trusted server is located; and
   upon determining that the certificate of the trusted remote proving server is not legitimate, terminating operation.

13. The one or more computer-readable media according to claim 8, wherein before receiving the challenge request sent by the first service trusted server, the acts further comprise:
   sending a platform metric policy request to a trusted policy management server, the platform metric policy request including:
      the certificate and the serial number of the second service trusted server, and
      the respective component of the second service trusted server and the corresponding metric policy identifier of the respective component of the second service trusted server encrypted through a public key of the trusted policy management server;
   receiving a platform metric policy response returned by the trusted policy management server, the platform metric policy response including:
      the serial number of the second service trusted server,
      a certificate of the trusted policy management server, and
      a ciphertext encrypted through the public key of the second service trusted server;
   determining whether the certificate of the trusted policy management server in the platform metric policy response is legitimate;
   upon determining that that the certificate of the trusted policy management server is legitimate, decrypting the ciphertext through a private key of the second service trusted server to obtain the respective component of the second service trusted server, the corresponding metric policy identifier of the respective component of the second service trusted server, and a component metric algorithm; and
      deploying the corresponding metric policy identifier of the respective component of the second service trusted server and the component metric algorithm in the respective component of the second service trusted server.

14. The one or more computer-readable media according to claim 13, wherein the acts further comprise:
   upon determining that that the certificate of the trusted policy management server is not legitimate, terminating operation.

15. An apparatus comprising:
   one or more processors; and
   memory communicatively coupled to the one or more processors, the memory storing computer-executable modules executable by the one or more processors, the computer-executable modules including:
   a receiving module configured to:
      receive a challenge request sent by a first service trusted server, the challenge request comprising:
         a certificate of the first service trusted server, and
         a serial number and a first random number of the first service trusted server encrypted through a public key of a second service trusted server;
      obtain to-be-verified information of the first service trusted server in the challenge request;
   a sending module configured to:
      when the to-be-verified information of the first service trusted server further includes a respective component of the second service trusted server and a corresponding metric policy identifier of the respective component of the second service trusted server encrypted through a public key of a trusted remote proving server, generate a verification request according to a certificate of the second service trusted server, a serial number of the second service trusted server, a second random number, the serial number of the first service trusted server, a respective component of the first service trusted server, a corresponding metric policy identifier of the respective component of the first service trusted server encrypted through the public key of the trusted remote proving server, the respective component of the second service trusted server, and the corresponding metric policy identifier of the respective component of the second service trusted server encrypted through the public key of the trusted remote proving server, and send the verification request to the trusted remote proving server, the verification request including the to-be-verified information of the first service trusted server; and an obtaining module configured to obtain a verification response returned by the trusted remote proving server.

16. The apparatus according to claim 15, wherein the challenge request further comprises the respective component of the first service trusted server and the corresponding metric policy identifier of the first service trusted server encrypted through the public key of the trusted remote proving server.

17. The apparatus according to claim 15, wherein the receiving module is further configured to:

determine whether the certificate of the first service trusted server is legitimate; upon determining that the certificate is legitimate, decrypt a ciphertext in the challenge request through a private key of the second service trusted server to obtain the to-be-verified information, the to-be-verified information including the serial number and the first random number of the first service trusted server; and upon determining that the certificate is not legitimate, terminate operation.

18. The apparatus according to claim 16, wherein the sending module is further configured to:

in response to determining that the to-be-verified information further includes the respective component of the first service trusted server and the corresponding metric policy identifier of the respective component of the first service trusted server encrypted through the public key of the trusted remote proving server, generate the verification request, according to the certificate of the second service trusted server, the serial number of the second service trusted server, the second random number, the sequence serial number of the first service trusted server, and the respective component of the first service trusted server and the corresponding metric policy identifier of the respective component of the first service trusted server encrypted through the public key of the trusted remote proving serve; and send the verification request to the trusted remote proving server.

19. The apparatus according to claim 15, wherein the obtaining module is further configured to:

determine whether a certificate of the trusted remote proving server in the verification response is legitimate when a ciphertext in the verification response is the public key of the second service trusted server;

upon determining that the certificate of the trusted remote proving server is legitimate, decrypt the ciphertext through a private key of the second service trusted server to obtain an identity of the first service trusted server and legitimacy of a platform in which the first service trusted server is located; and upon determining that the certificate of the trusted remote proving server is not legitimate, terminate operation.

20. The apparatus according to claim 15, wherein the second service trusted server is configured to:

send a platform metric policy request to a trusted policy management server, the platform metric policy request including:

the certificate and the serial number of the second service trusted server, and the respective component of the second service trusted server and the corresponding metric policy identifier of the respective component of the second service trusted server encrypted through a public key of the trusted policy management server;

receive a platform metric policy response returned by the trusted policy management server, the platform metric policy response including:

the serial number of the second service trusted server, a certificate of the trusted policy management server, and a ciphertext encrypted through the public key of the second service trusted server;

determine whether the certificate of the trusted policy management server in the platform metric policy response is legitimate;

upon determining that that the certificate of the trusted policy management server is legitimate:

decrypt the ciphertext through a private key of the second service trusted server to obtain the respective component of the second service trusted server, the corresponding metric policy identifier of the respective component of the second service trusted server, and a component metric algorithm, and deploying the corresponding metric policy identifier of the respective component of the second service trusted server and the component metric algorithm in the respective component of the second service trusted server; and upon determining that that the certificate of the trusted policy management server is not legitimate, terminate operation.

* * * * *